(12) United States Patent
Chen et al.

(10) Patent No.: US 12,096,375 B2
(45) Date of Patent: Sep. 17, 2024

(54) POWER CONTROL PARAMETER CONFIGURATIONS FOR PHYSICAL UPLINK SHARED CHANNELS IN THE PRESENCE OF SPATIAL DIVISION MULTIPLEXING

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 17/644,205

(22) Filed: Dec. 14, 2021

(65) Prior Publication Data

US 2023/0189159 A1 Jun. 15, 2023

(51) Int. Cl.
*H04W 52/14* (2009.01)
*H04L 5/00* (2006.01)
*H04W 52/32* (2009.01)
*H04W 72/044* (2023.01)
*H04W 72/1263* (2023.01)
*H04W 72/23* (2023.01)

(52) U.S. Cl.
CPC ......... *H04W 52/146* (2013.01); *H04L 5/0051* (2013.01); *H04W 52/325* (2013.01); *H04W 72/046* (2013.01); *H04W 72/1263* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2022/0322245 A1* | 10/2022 | Park | H04W 52/365 |
| 2022/0322393 A1* | 10/2022 | Lin | H04W 72/23 |
| 2023/0198719 A1* | 6/2023 | Wang | H04B 7/024 370/329 |
| 2023/0209567 A1* | 6/2023 | Grossmann | H04L 5/0051 370/329 |

FOREIGN PATENT DOCUMENTS

KR 10-2022-003917 * 10/2022

OTHER PUBLICATIONS

Author Unknown, Enhancements on Multi-TRP for PDCCH, PUCCH and PUSCH, pp. 1-15, Oct. 19, 2021.*

(Continued)

*Primary Examiner* — Christopher M Crutchfield
(74) *Attorney, Agent, or Firm* — Haynes and Boone, LLP

(57) ABSTRACT

Wireless communications systems and methods related to communicating control information are provided. A method of wireless communication performed by a user equipment (UE) may include receiving, from a base station (BS), a joint sounding reference signal (SRS) resource indicator (SRI), wherein the joint SRI includes a first SRI field and a second SRI field and transmitting, to a transmission/reception point (TRP), one or more physical uplink shared channel (PUSCH) communications based on SRS resources and transmission parameters associated with the joint SRI.

30 Claims, 13 Drawing Sheets

(56) References Cited

OTHER PUBLICATIONS

Intel Corporation: "Multi-TRP Enhancements for PDCCH, PUCCH and PUSCH", 3GPP TSG RAN WG1 #104b-e, R1-2103015, 3rd Generation Partnership Project Gpp), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, 21 Pages, XP052177823, p. 4-6, p. 10-11, p. 15-16.
Interdigital: "Remaining Details on Enhancements for PDCCH, PUCCH, and PUSCH", 3GPP TSG RAN WG1 #106b-e, R1-2108809, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, pp. 1-8, XP052057877, p. 5-7.
International Search Report and Written Opinion—PCT/US2022/050171—ISA/EPO—Mar. 30, 2023.
Qualcomm Incorporated: "Enhancements on Multi-TRP for PDCCH, PUCCH and PUSCH", 3GPP TSG-RAN WG1 Meeting #104-bis-e, R1-2103151, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 33 Pages, Apr. 7, 2021, XP052177951, The Whole Document, p. 16-21, p. 29-30.

* cited by examiner

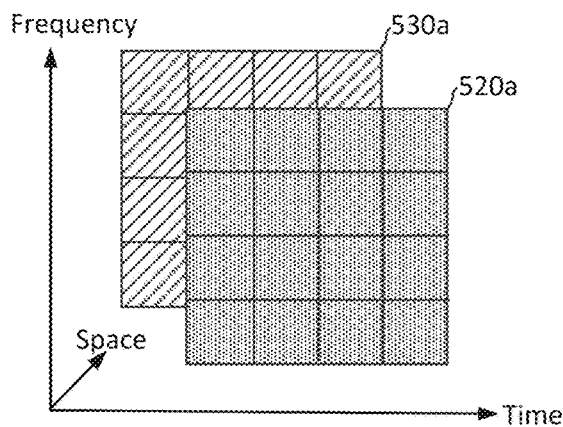
FIG. 5A
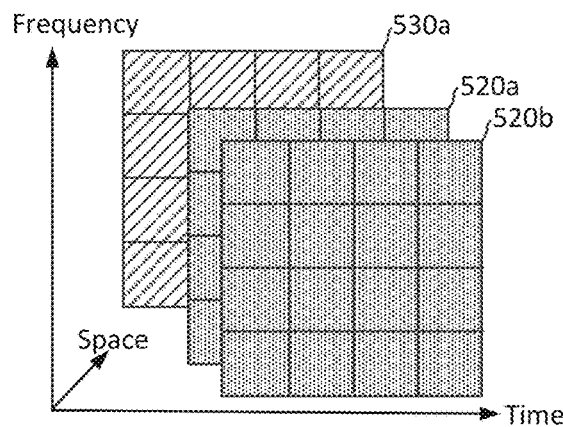
FIG. 5B
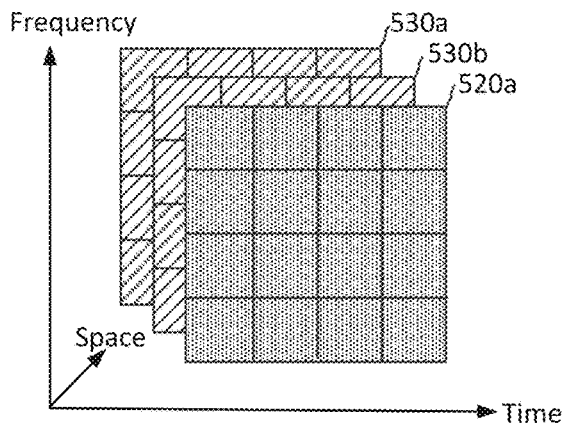
FIG. 5C
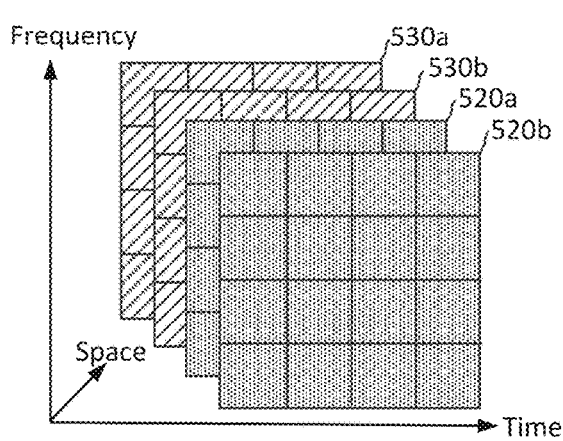
FIG. 5D
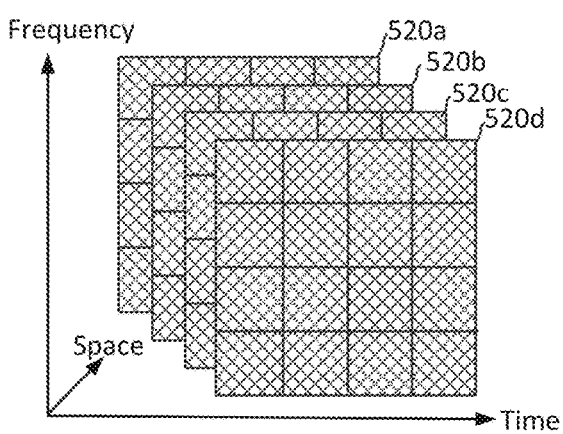
FIG. 5E
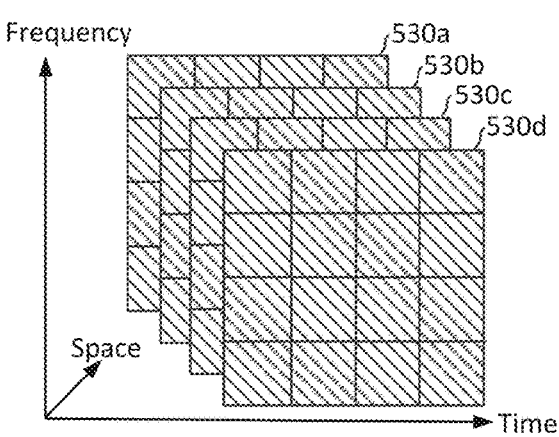
FIG. 5F
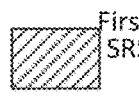 First TRP – First SRS Resource Set 510a
 Second TRP – Second SRS Resource Set 510b
 First/Second TRP – First Joint SRS Resource Set 510c
 Second TRP – Second Joint SRS Resource Set 510d

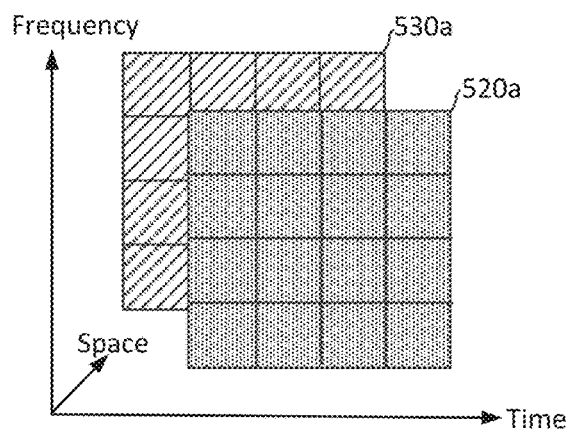
FIG. 6A
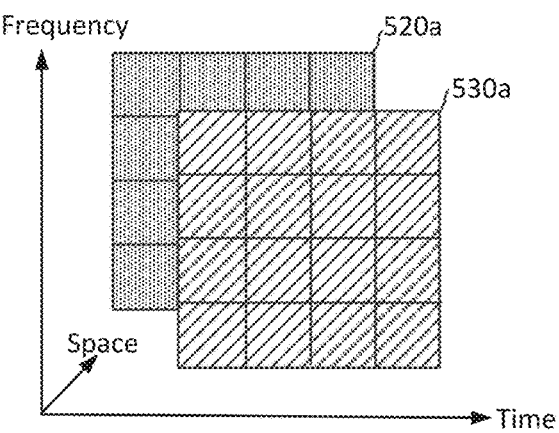
FIG. 6B
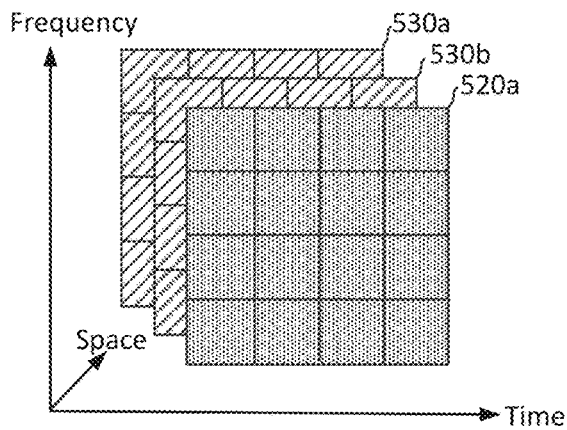
FIG. 6C
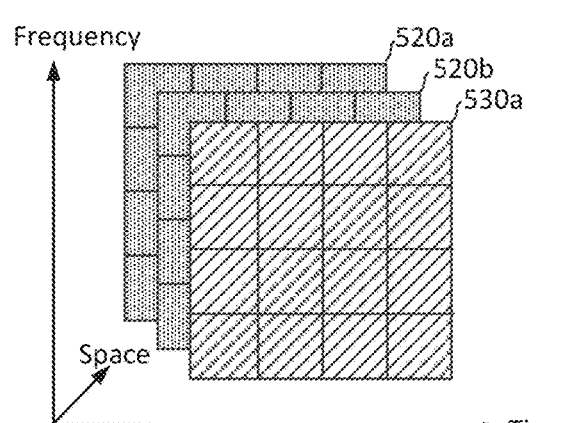
FIG. 6D
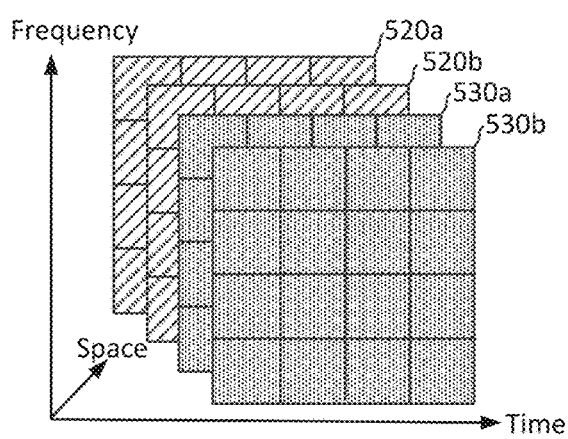
FIG. 6E
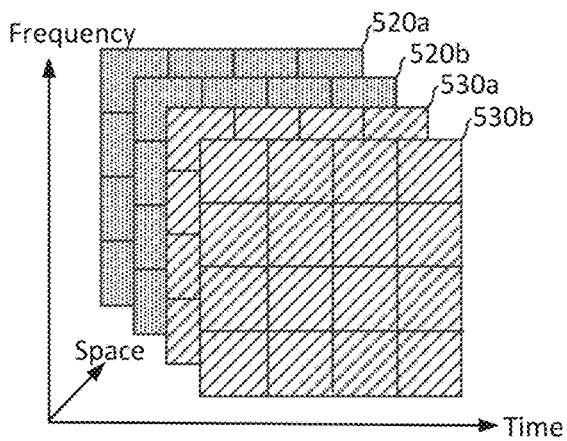
FIG. 6F
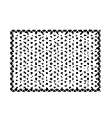
First TRP - First SRS Resource Set 510a
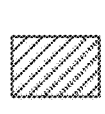
Second TRP - Second SRS Resource Set 510b

POWER CONTROL PARAMETER CONFIGURATIONS FOR PHYSICAL UPLINK SHARED CHANNELS IN THE PRESENCE OF SPATIAL DIVISION MULTIPLEXING

TECHNICAL FIELD

This application relates to wireless communication systems, and more particularly, to configuring power control parameters for physical uplink shared channel communications in new radio communications in the presence of spatial division multiplexing.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. The BS and/or the UE may use one or more transmission receptions points and one or more beams to communicate. In some systems, a UE may support transmission of one or more uplink data messages according to any one of a time division multiplexing (TDM) scheme, a spatial division multiplexing (SDM) scheme, and a frequency division multiplexing (FDM) scheme.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) may include receiving, from a base station (BS), a joint sounding reference signal (SRS) resource indicator (SRI). The joint SRI may include a first SRI field and a second SRI field. The method may further include transmitting, to a transmission/reception point (TRP), one or more physical uplink shared channel (PUSCH) communications based on SRS resources and transmission parameters associated with the joint SRI.

In an additional aspect of the disclosure, a method of wireless communication performed by a base station (BS) may include transmitting, to a user equipment (UE), a joint sounding reference signal (SRS) resource indicator (SRI). The joint SRI may include a first SRI field and a second SRI field. The method may further include receiving, via transmission/reception point (TRP), one or more physical uplink shared channel (PUSCH) communications based on SRS resources and transmission parameters associated with the joint SRI.

In an additional aspect of the disclosure, a user equipment (UE) may include a memory; a transceiver; and at least one processor coupled to the memory and the transceiver, wherein the UE is configured to receive, from a base station (BS), a joint sounding reference signal (SRS) resource indicator (SRI). The joint SRI may include a first SRI field and a second SRI field. The UE may be further configured to transmit, to a transmission/reception point (TRP), one or more physical uplink shared channel (PUSCH) communications based on SRS resources and transmission parameters using the joint SRI.

In an additional aspect of the disclosure, a base station (BS) may include a memory; a transceiver; and at least one processor coupled to the memory and the transceiver, wherein the BS is configured to transmit, to a user equipment (UE), a joint sounding reference signal (SRS) resource indicator (SRI). The joint SRI may include a first SRI field and a second SRI field. The BS may be further configured to receive, via a transmission/reception point (TRP), one or more physical uplink shared channel (PUSCH) communications based on SRS resources and transmission parameters using the joint SRI.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

BRIEF DESCRIPTION OF THE DRAWINGS

FIGS. 5A-5F illustrate transmission schemes associated with PUSCH communications according to some aspects of the present disclosure.

FIGS. 6A-6F illustrate transmission schemes associated with PUSCH communications according to some aspects of the present disclosure.

DETAILED DESCRIPTION

Figure 1:
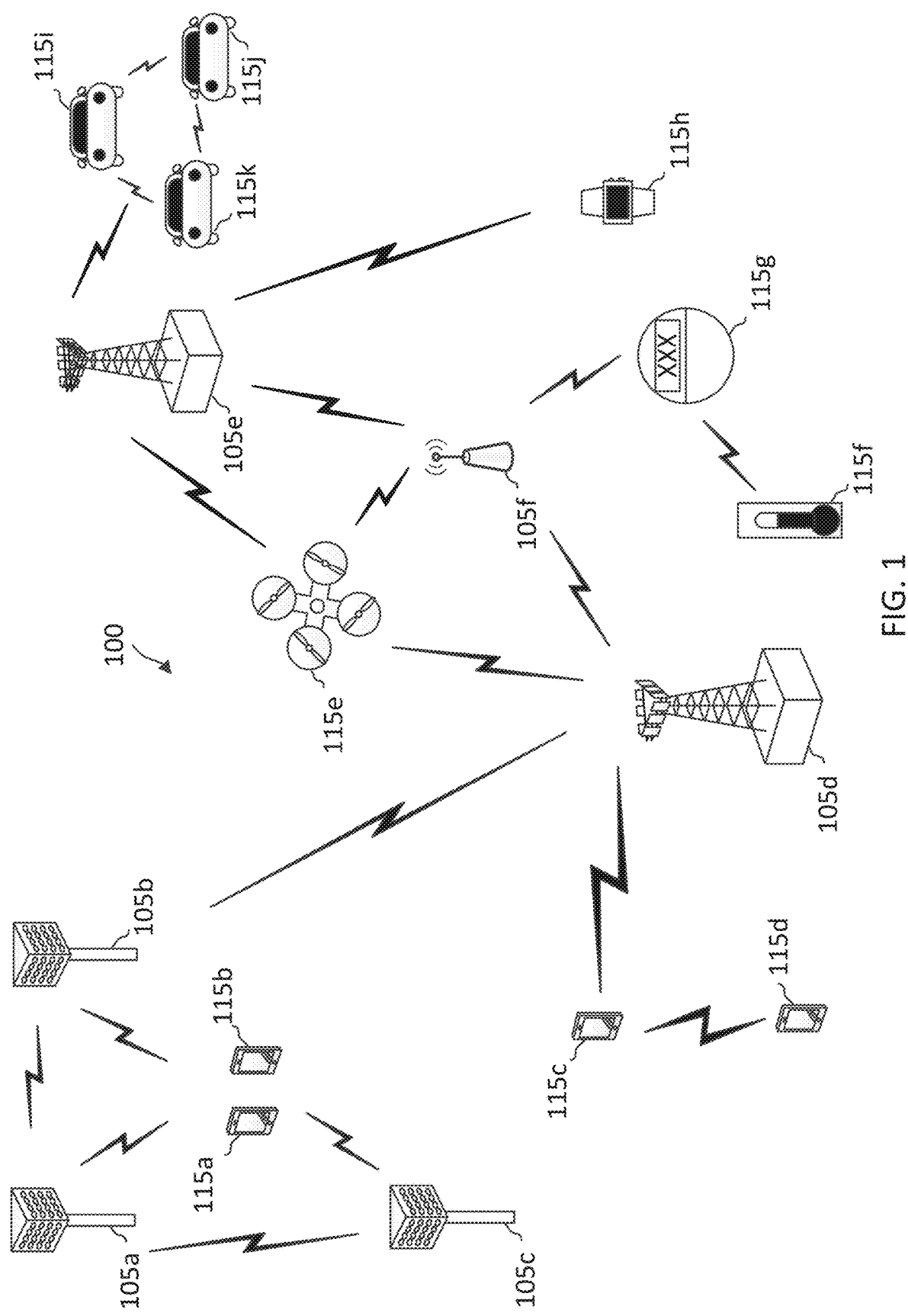
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure may provide several benefits. In some aspects, the UE may receive a joint sounding reference signal (SRS) resource indicator (SRI) from a base station (BS). The joint SRI may include a first SRI field and a second SRI field. The UE may transmit one or more physical uplink shared channel (PUSCH) communications to a transmission/reception point (TRP) based on SRS resources and transmission parameters using the joint SRI. In some aspects, the use of a joint SRI in accordance with aspects of the present disclosure provides uplink resource allocations that are not possible with existing systems. For example, in the context of SDM of PUSCH communications, providing a communication system with the ability to use a first SRI field, second SRI field, and/or joint SRI in accordance with the present disclosure allows for uplink resource allocations that are not available with only two SRIs and the associated mappings of SRS resources and transmission/power control parameters. The joint SRI and associated mappings of SRS resources and transmission/power control parameters of the present disclosure provide additional flexibility to the network and/or BS in allocating uplink resources in a manner that will meet the bandwidth and/or latency demands of UEs. Further, the joint SRI and associated mappings of SRS resources and transmission/power control parameters of the present disclosure are compatible with SDM, TDM, and/or FDM PUSCH communications. In these manners, the UE and the BS may increase the overall performance of the network, including for example increased uplink throughput, reduced power usage, more efficient allocation of uplink resources, etc. by implementing one or more aspects of the present disclosure.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames.

A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115 may receive a joint sounding reference signal (SRS) resource indicator (SRI) from the BS 105. The joint SRI may include a first SRI field and a second SRI field. The UE 115 may transmit one or more physical uplink shared channel (PUSCH) communications to a transmission/reception point (TRP) based on SRS resources and transmission parameters using the joint SRI. In this manner, the UE 115 and the BS 105 may increase the overall performance of the network.

Figure 2:
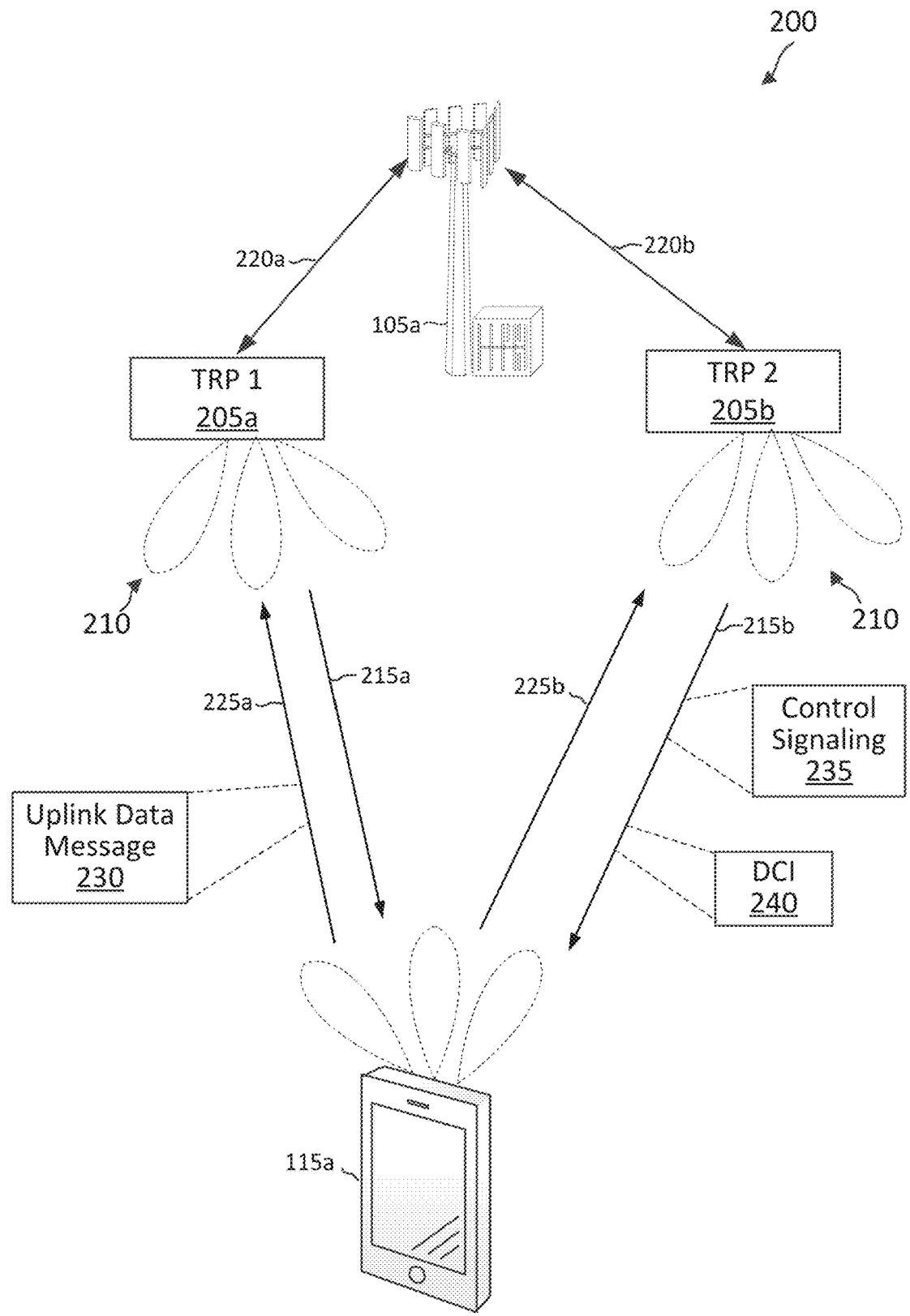
FIG. 2 illustrates a wireless communication network with multiple transmission reception points according to some aspects of the present disclosure.

FIG. 2 illustrates an example of a wireless communications network 200 that supports dynamic switching between communications schemes for uplink communications in accordance with aspects of the present disclosure. The wireless communications network 200 may be implemented by aspects of the wireless communications network 100 as described with reference to FIG. 1. For example, the wireless communications network 200 may include a BS 105a and a UE 115a, which may represent examples of a UE 115 and a BS 105 as described with reference to FIG. 1.

In the example of FIG. 2, the BS 105a may include one or more access network transmission entities, which may be referred to as radio heads, smart radio heads, or transmission/reception points (TRPs) 205. The BS 105a may communicate with the TRPs 205a and 205b via links 220a and 220b, respectively. The UE 115a may communicate with the TRPs 205a and 205b via downlink communication links 215 and uplink communication links 225. The TRPs 205 may forward downlink data and control information from the BS 105a to the UE 115a. The TRPs 205 may receive uplink data from the UE 115a and forward the uplink data to the BS 105a via the links 220. The TRPs 205 and the UE 115a may support beamformed communications. For example, the TRP 205a, the TRP 205b, and the UE 115a may each perform beamforming using a respective set of beams 210 for uplink and downlink communications.

The UE 115a may transmit one or more uplink data messages 230 (e.g., PUSCH communications) to the BS 105a via the uplink communication link 225a and/or the uplink communication link 225b (e.g., via the TRPs 205). In some cases, the BS 105a may schedule the uplink communications by the UE 115a. The BS 105a may configure an SRS resource set for uplink communications by the UE 115a. Each SRS resource or SRS resource group in the SRS resource set may be associated with a set of transmission parameters, such as a spatial domain filter (e.g., a beam direction), power control settings, a number of antenna ports, or other transmission parameters. The UE 115a may receive at least one of a first sounding reference signal (SRS) resource indicator (SRI), a second SRI, and/or a joint SRI indicator from the BS 105a. The joint SRI may comprise a concatenation of two or more SRIs (e.g., the first SRI and the second SRI). The SRI may indicate one or more of the SRS resources from an SRS resource set. In this regard, the UE 115a may receive the first SRI, the second SRI, or the joint SRI indicator in downlink control information (DCI) 240. In some aspects, the SRS resource set may include time domain resources and/or frequency domain resources including symbols, slots, frames, sub-frames, transmission time intervals, resource elements, resources blocks, subchannels, frequency bands, subbands, coresets, bandwidth parts, or a combination thereof.

The BS 105a may transmit a scheduling DCI 240 to the UE 115a to schedule each uplink data message 230. The BS 105a may transmit the scheduling DCI 240 to the UE 115a via a physical downlink control channel (PDCCH) of the downlink communication link 215a and/or the downlink communication link 215b (e.g., via one or both of the TRPs 205a and 205b). The BS 105a may transmit an SRI field in the DCI 240 that may indicate one or more SRS resources from the SRS resource set that are associated with the respective uplink data message 230. The UE 115a may transmit the uplink data message 230 using transmission parameters (e.g., power control settings, beam settings, time/frequency resources, transmission sequences, etc.) that are associated with the indicated SRS resource(s).

The UE 115a may support two types of uplink communications, including codebook-based physical uplink shared data channel (PUSCH) communications and non-codebook-based PUSCH communications. The SRS resources may be configured based on the type of uplink communications. For codebook-based PUSCH communication, the BS 105a may transmit control signaling 235 (e.g., RRC signaling) that configures the SRS resource set for codebook-based PUSCH communication (e.g., an SRS resource set with "usage" set to "codebook"). The SRS resource set may include a first number of SRS resources configured for the UE 115a (e.g., a maximum of four SRS resources, or other suitable number of resources). Each SRS resource or SRS resource group in the SRS resource set may be configured with a number of antenna ports (e.g., nrofSRS-Ports, 1 port, 2 ports, 3 ports, etc.). The SRI field in the DCI 240 may indicate one SRS resource from the SRS resource set. The UE 115a may determine a number of antenna ports to use for transmitting the uplink data message 230 based on a number of antenna ports that are associated with the indicated SRS resources. The UE 115a may transmit the uplink data message 230 using the same spatial domain filter (e.g., beam direction) as the indicated SRS resource. The DCI 240, the MAC-CE, and/or the RRC may include a different field, such as a precoding information and a number of layers to indicate a number of spatial layers (e.g., a number of data layers or rank) and/or a precoder (e.g., a transmit precoding matrix indicator (TPMI) for the uplink data message 230.

For non-codebook-based PUSCH communication, the BS 105a may transmit the control signaling 235 (e.g., RRC signaling) that configures the SRS resource set for non-codebook-based PUSCH communication (e.g., an SRS resource set with "usage" set to "non-codebook"). The SRS resource set may include a first number of SRS resources configured for the UE 115a (e.g., a maximum of four SRS resources, or some other suitable number of SRS resources). Each SRS resource in the SRS resource set may be configured with, for example, one antenna port. The SRI field in the DCI 240 may indicate one or more SRS resources from the SRS resource set. The UE 115a may determine a number of antenna ports to use for transmitting the uplink data message 230 based on a number of SRS resources that are indicated via the DCI 240. For non-codebook-based PUSCH communications the number of antenna ports may correspond to a number of spatial layers of the uplink data message 230, a number of TRPs 205 associated with the uplink data message 230, or both. The UE 115a may transmit the uplink data message 230 using a same spatial domain filter (e.g., beam direction) as the indicated SRS resource(s). For both codebook-based and non-codebook-based PUSCH, a size of the SRI field in the DCI 240 (e.g., a number of bits) may be based on a number of SRS resources within the SRS resource set configured for the UE 115a.

To support switching between the sets of transmission parameters for each uplink data message 230, the DCI 240 may include a dynamic switching field configured to indicate which set(s) of parameters the UE 115a should use and an order for switching between the sets of transmission parameters. The described techniques support transmission of uplink PUSCH communications according to an SDM scheme, a TDM scheme, an FDM scheme, an sTRP transmission scheme, or any combination thereof. The UE 115a may switch between multiple PUSCH communications schemes for transmission of uplink data messages 230, which may provide for improved communication reliability and efficiency for uplink communications.

Figure 3:
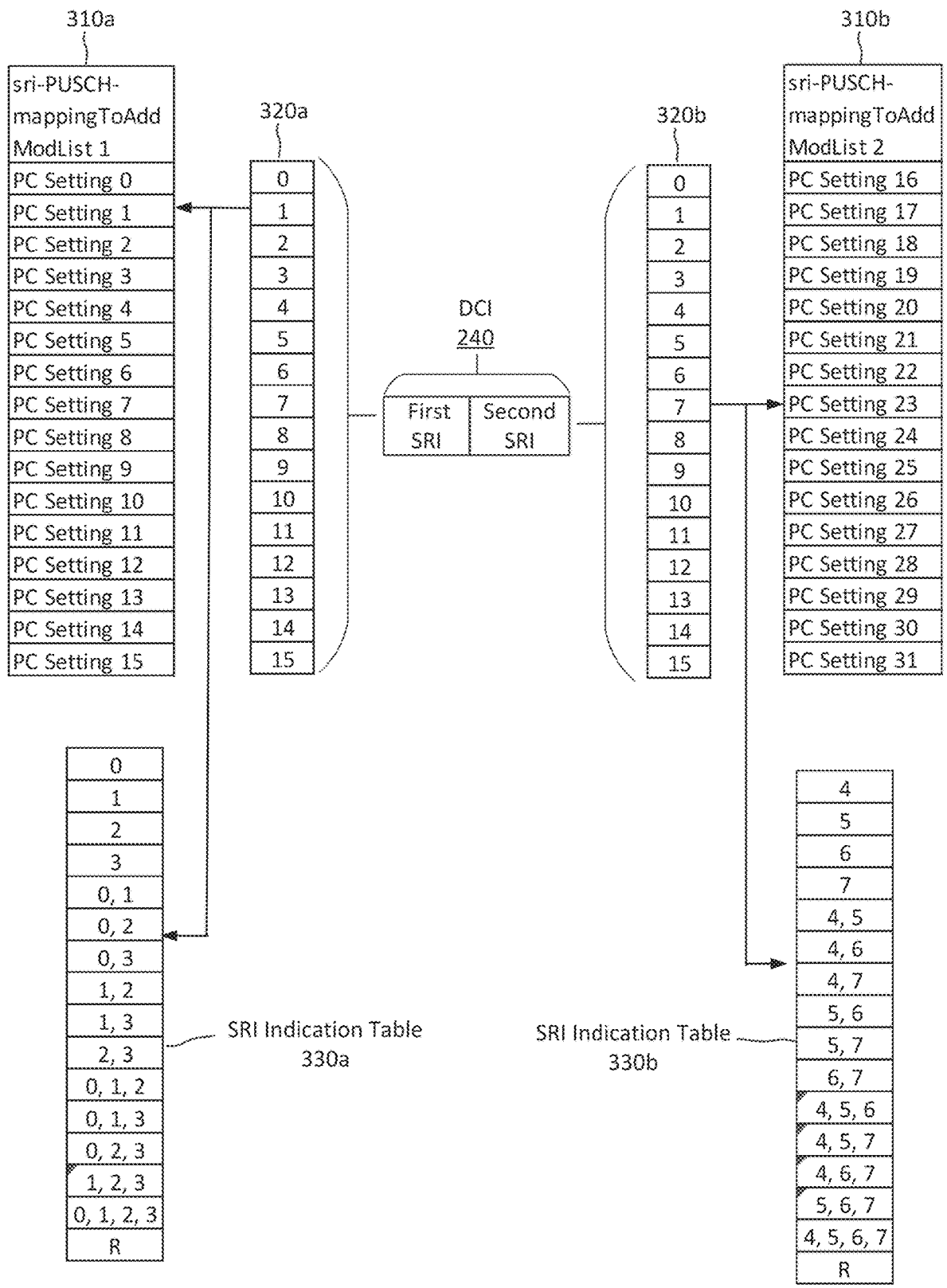
FIG. 3 illustrates mappings of power control settings and SRS resources associated with PUSCH communications to SRI codepoint values according to some aspects of the present disclosure.

FIG. 3 illustrates mappings of power control settings and SRS resources associated with PUSCH communications to SRI codepoint values according to some aspects of the present disclosure. In some aspects, the BS (e.g., BS 105 or BS 1000) may transmit a DCI 240 to the UE (e.g., UE 115 or UE 900) that includes a first SRI 242 and/or a second SRI 244, which may also be referred to as first and second SRI fields. As discussed in greater detail below, a codepoint 320a of the first SRI field and/or a codepoint 320b of the second SRI field may be utilized by the UE to determine the SRS resources and/or transmission parameters, including without limitation power control parameters, such as a P0 value, an Alpha value for open-loop power control through sri-P0-PUSCH-AlphaSetId, a pathloss value through sri-PUSCH-PathlossReferenceRS-ID, a closed-loop power control index value through sri-PUSCH-ClosedLoopIndex, and/or other power control parameters, and/or precoding parameters (e.g., TPMI), used for PUSCH communications.

For example, FIG. 3 illustrates mappings 340a, 340b for power control parameters and SRI indication tables 330a, 330b for SRS resources, which may be referred to as SRI indication for non-codebook based PUSCH transmission in some instances. The mapping 340a for power control parameters and the SRI indication table 330a for SRS resources may be mapped relative to codepoints 320a of the first SRI 242. The mapping 340b for power control parameters and the SRI indication table 330b for SRS resources may be mapped relative to codepoint values 320b of the second SRI 244.

In some aspects, the first SRI 242 and the second SRI 244 may each include 4 bits. The 4 bits of the first SRI 242 and the 4 bits of the second SRI 244 may each indicate one of up to 16 different codepoint values (e.g., values 0 to 15), as shown in the lists of the codepoint 320a, 320b. The 16 different codepoint values may be mapped to SRS resources and/or power control parameters using the mappings 340a, 340b, and SRI indication tables 330a, and/or 330b. For example, the first SRI 242 may be mapped to 16 sets of power control parameters in accordance with mapping 340a (e.g., sri-PUSCH-MappingToAddModList_1) based on the codepoint values 320a of the first SRI 242. The second SRI 244 may be mapped to 16 sets of power control parameters in accordance with mapping 340b (e.g., sri-PUSCH-MappingToAddModList_2) based on the codepoint values 320b of the second SRI 244. Each of the two sets of 16 power control parameters in the mappings 340a, 340b may include the same or different power control parameters. Similarly, the two SRI indication tables 330a, 330b of SRS resources may include the same or different SRS resources and/or groupings of SRS resources. In the illustrated example of FIG. 3, the SRI indication tables 330a, 330b include SRS resources comprising one SRS resource, two SRS resources, three SRS resources, or four SRS resources. It is understood that mappings of SRS resources in accordance with the present disclosure may include any quantity of SRS resources (e.g., 1, 2, 3, 4, 5, 6, 7, 8, etc.) in an SRS resource grouping (e.g., a row in the SRI indication tables 330a, 330b).

When a dynamic switching field of the DCI 240 indicates to use parameters associated with both the first SRI field and the second SRI field, first PUSCH communications may be associated with the first SRI field and directed toward a first transmission/reception point (TRP) and second PUSCH communications may be associated with the second SRI field and directed toward a second TRP. The first PUSCH communications may be transmitted using SRS resources indicated by the SRI indication table 330a and a power level indicated by the mapping 340a in accordance with a codepoint value of the first SRI 242. For example, FIG. 3 illustrates how codepoint value of "1" maps to SRS Resource "1" (as shown in SRI indication table 330a) and "PC Setting 1" (as shown in mapping 340a). The second PUSCH communications may be transmitted using SRS resources indicated by the SRI indication table 330b and a power level indicated by the mapping 340b in accordance with a codepoint value of the second SRI 244. For example, FIG. 3 illustrates how codepoint value of "7" maps to SRS Resources "6, 7" (as shown in SRI indication table 330b) and "PC Setting 23" (as shown in mapping 340b). The first PUSCH communications may be associated with the first SRI 242 and transmitted via a first beam (e.g., a first directional beam), while the second PUSCH communications may be associated with the second SRI 244 and transmitted via a second beam (e.g., a second directional beam).

Figure 4A:
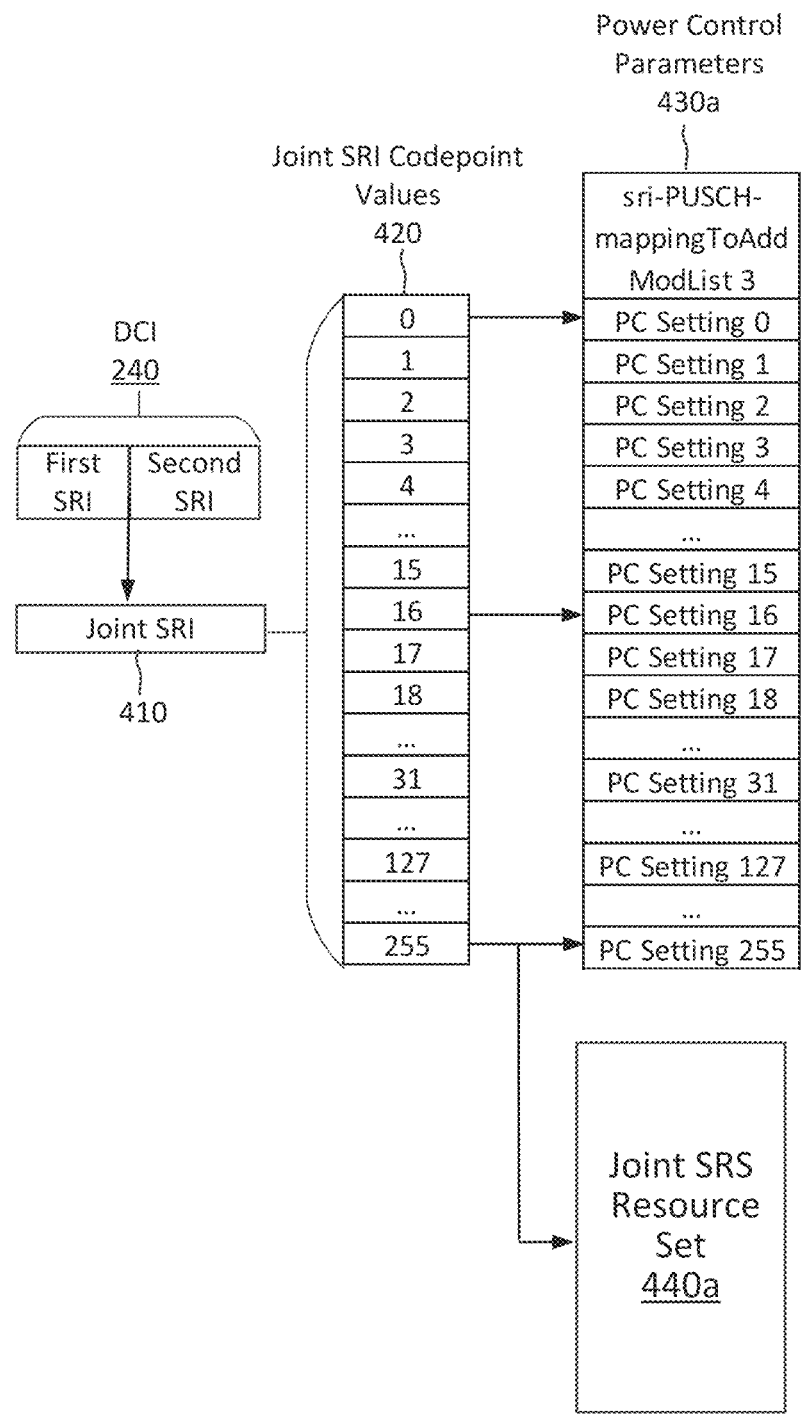
FIGS. 4A and 4B illustrate mappings of power control settings and SRS resources associated with PUSCH communications to joint SRI codepoint values according to some aspects of the present disclosure.

FIG. 4A illustrates mappings of power control settings and SRS resources associated with PUSCH communications to joint SRI codepoint values according to some aspects of the present disclosure. In some aspects, the UE (e.g., UE 115 or UE 900) may receive a joint SRI 410 from the BS (e.g., BS 105 or BS 1000) in downlink control information (DCI), MAC-CE, RRC message, and/or another suitable communication or information element. The joint SRI 410 may comprise a plurality of bits (e.g., 4 bits, 6 bits, 8 bits, 12 bits, 16 bits, 24 bits, 32 bits, or other suitable number of bits). In some instances, the joint SRI 410 can include a first SRI field 412 and a second SRI field 414, each of the first SRI field 412 and the second SRI field 414 having a plurality of bits. For example, the joint SRI 410 can include a total number of bits (e.g., 4 bits, 6 bits, 8 bits, 12 bits, 16 bits, 24 bits, 32 bits, or other suitable number of bits) equal to the number of bits in the first SRI field 412 (e.g., 2 bits, 3 bits, 4 bits, 6 bits, 8 bits, 12 bits, 16 bits, or other suitable number of bits) plus the number of bits in the second SRI field 414 (e.g., 2 bits, 3 bits, 4 bits, 6 bits, 8 bits, 12 bits, 16 bits, or other suitable number of bits). The first and second SRI fields 412, 414 may have an equal number of bits or a different number of bits. The joint SRI 410 may comprise a concatenation of two or more SRI fields (e.g., a concatenation of the first SRI field 412 and the second SRI field 414). In some instances, the first SRI field 412 and/or the second SRI field 414 may itself be an SRI.

As discussed in greater detail below, a joint SRI codepoint value of the joint SRI 410 may be utilized by the UE to determine the SRS resources and/or transmission parameters, including without limitation power control settings, such as a P0 value, an Alpha value for open-loop power control through sri-P0-PUSCH-AlphaSetId, a pathloss value through sri-PUSCH-PathlossReferenceRS-ID, a closed-loop power control index value through sri-PUSCH-ClosedLoop-Index, and/or other power control parameters, and/or precoding parameters (e.g., TPMI), for PUSCH communications. For example, FIG. 4A illustrates a mapping 430a for SRS resources, which may be referred to as an SRS resource set in some instances, and a mapping 440a for power control parameters. The mapping 430a for SRS resources and the mapping 440a for power control parameters may be mapped relative to joint SRI codepoint values 420 of the joint SRI for PUSCH transmissions directed to a first TRP (e.g., TRP 205a).

In some aspects, the UE may be configured by the BS with a joint SRS resource set and the mapping 430a may associate one or more SRS resources (e.g., a single SRS resource or a group of two or more SRS resources) from the joint SRS resource set with corresponding joint SRI codepoint values. The joint SRS resource set may include time domain resources, spatial domain resources, and/or frequency domain resources including symbols, slots, frames, subframes, transmission time intervals, beams (e.g., directional beams), resource elements, resources blocks, subchannels, frequency bands, subbands, coresets, bandwidth parts, or a combination thereof. The UE may receive an indication of the joint SRS resource set from the BS via radio resource control (RRC) signaling or other suitable signaling. In some aspects, the joint SRS resource set is provided to the UE in addition to SRS resource sets that may be associated with individual SRIs. In some instances, the joint SRS resource set 430a is a third SRS resource set configured to the UE. In some aspects, the joint SRS resource set 430a may include an SRS resource set associated with an individual SRI. For example, the joint SRS resource set 430a may include an SRS resource set associated with the first SRI field 412 and/or the second SRI field 414. That is, the SRS resource set associated with the first SRI field 412 and/or the second SRI field 414 may make up a subset of the joint SRS resource set. In some instances, the joint SRS resource set 430a may not include the SRS resource set associated with the first SRI field 412 and/or the second SRI field 414.

In some instances, the joint SRS resource set 430a may include 8 SRS resources. The particular SRS resources (e.g., one or more of the 8 SRS resources) from the joint SRS resource set that a UE is to utilize for sTRP PUSCH communications to the first TRP may be indicated by the joint SRI 410. For example, the 8 bits of the joint SRI 410 may map to 256 joint SRI codepoint values 420. The 256 joint SRI codepoint values 420 may map to 256 SRS resource groupings of the 8 SRS resources for PUSCH communications. In some aspects, the 8 SRS resources in the joint SRS resource set 430a may include the 4 SRS resources from the SRS resource set associated with the first SRI field 412 and the 4 SRS resources from the SRS resource set associated with the second SRI field 414. In some aspects, the 8 SRS resources in the joint SRS resource set 430a may be different from the SRS resources in the SRS resource sets associated with the first SRI field 412 and/or the second SRI field 414.

In some aspects, the mapping 440a of power control parameters associated with the joint SRI 410 is provided to the UE in addition to mappings of power control parameters (e.g., mappings 340a, 340b of FIG. 3; sri-PUSCH-MappingToAddModList_1 and sri-PUSCH-MappingToAddModList_2) that may be associated with individual SRIs. In some instances, the mapping 440a is a third power control mapping (e.g., sri-PUSCH-MappingToAddModList_3) configured to the UE. In some aspects, the mapping 440a of power control parameters associated with the joint SRI 410 may include a mapping of power control parameters associated with an individual SRI. For example, the mapping 440a may include a mapping of power control parameters associated with the first SRI field 412 and/or the second SRI field 414. That is, the mapping of power control parameters associated with the first SRI field 412 and/or the second SRI field 414 may make up a subset 442a of the mapping 440a of power control parameters associated with the joint SRI. In some instances, the mapping 440a may not include the power control parameter mapping associated with the first SRI field 412 and/or the second SRI field 414.

Figure 4B:
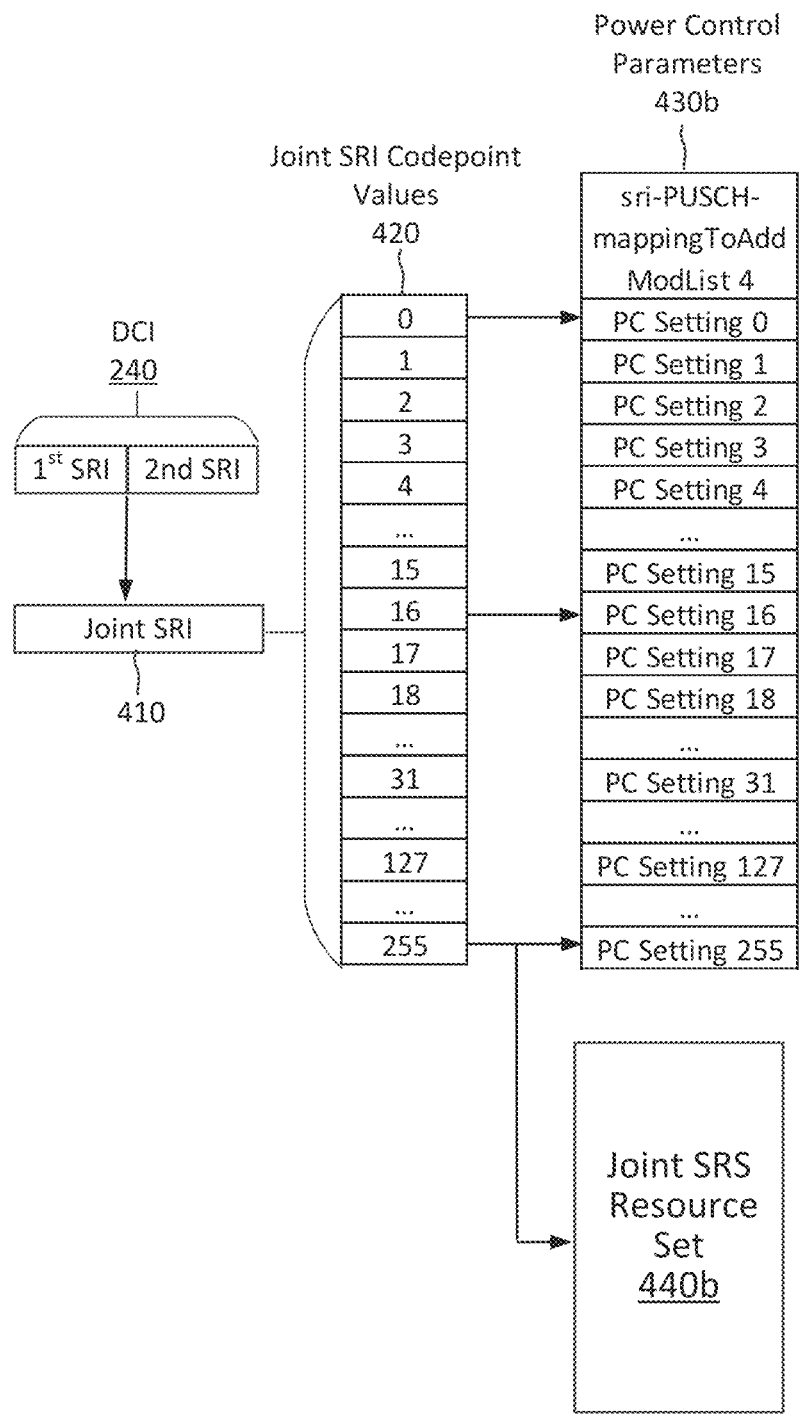

FIG. 4B illustrates mappings of power control settings and SRS resources associated with PUSCH communications to joint SRI codepoint values according to some aspects of the present disclosure. FIG. 4B illustrates similar mappings as described above with reference to FIG. 4A. For example, FIG. 4B illustrates a mapping 430b for SRS resources, which may be referred to as an SRS resource set in some instances, and a mapping 440b for power control parameters. However, the mapping 430b for SRS resources and the mapping 440b for power control parameters may be mapped relative to joint SRI codepoint values 420 of the joint SRI for PUSCH transmissions directed to a second TRP (e.g., TRP 205b) that is different than the first TRP to which mappings 430a and 440a of FIG. 4A are associated.

In some aspects, the joint SRS resource set 430b is provided to the UE in addition to SRS resource sets (e.g., SRI indication tables 330a, 330b of FIG. 3) that may be associated with individual SRIs. In some instances, the joint SRS resource set 430b is a fourth SRS resource set configured to the UE (e.g., in addition to joint SRS resource set 430a, an SRS resource set associated with the first SRI field 412, and an SRS resource set associated with the second SRI field 414). In some aspects, the joint SRS resource set 430b may include an SRS resource set associated with an individual SRI. For example, the joint SRS resource set 430b may include an SRS resource set associated with the first SRI field 412 and/or the second SRI field 414. That is, the SRS resource set associated with the first SRI field 412 and/or the second SRI field 414 may make up a subset of the joint SRS resource set 430b. In some instances, the joint SRS resource set 430*b* may not include the SRS resource set associated with the first SRI field 412 and/or the second SRI field 414.

In some instances, the joint SRS resource set 430*b* may include 8 SRS resources. The particular SRS resources (e.g., one or more of the 8 SRS resources) from the joint SRS resource set that a UE is to utilize for sTRP PUSCH communications to the second TRP may be indicated by the joint SRI 410. For example, the 8 bits of the joint SRI 410 may map to 256 joint SRI codepoint values 420. The 256 joint SRI codepoint values 420 may map to 256 SRS resource groupings of the 8 SRS resources for PUSCH communications. In some aspects, the 8 SRS resources in the joint SRS resource set 430*b* may include the 4 SRS resources from the SRS resource set associated with the first SRI field 412 and the 4 SRS resources from the SRS resource set associated with the second SRI field 414. In some aspects, the 8 SRS resources in the joint SRS resource set 430*a* may be different from the SRS resources in the SRS resource sets associated with the first SRI field 412 and/or the second SRI field 414.

In some aspects, the mapping 440*a* of power control parameters associated with the joint SRI 410 is provided to the UE in addition to mappings of power control parameters (e.g., mappings 340*a*, 340*b* of FIG. 3; sri-PUSCH-Mapping-ToAddModList_1 and sri-PUSCH-MappingToAddMod-List_2) that may be associated with individual SRIs. In some instances, the mapping 440*a* is a third power control mapping (e.g., sri-PUSCH-MappingToAddModList_3) configured to the UE. In some aspects, the mapping 440*a* of power control parameters associated with the joint SRI 410 may include a mapping of power control parameters associated with an individual SRI. For example, the mapping 440*a* may include a mapping of power control parameters associated with the first SRI field 412 and/or the second SRI field 414. That is, the mapping of power control parameters associated with the first SRI field 412 and/or the second SRI field 414 may make up a subset 442*a* of the mapping 440*a* of power control parameters associated with the joint SRI. In some instances, the mapping 440*a* may not include the power control parameter mapping associated with the first SRI field 412 and/or the second SRI field 414.

In some aspects, the mapping 440*b* of power control parameters associated with the joint SRI 410 is provided to the UE in addition to mappings of power control parameters (e.g., mappings 340*a*, 340*b* of FIG. 3; sri-PUSCH-Mapping-ToAddModList_1 and sri-PUSCH-MappingToAddMod-List_2) that may be associated with individual SRIs (e.g., first SRI field 412 or second SRI field 414). In some instances, the mapping 440*b* is a fourth power control mapping (e.g., sri-PUSCH-MappingToAddModList_4) configured to the UE (e.g., in addition to mappings 340*a*, 340*b*, 440*a* or in addition to sri-PUSCH-MappingToAddMod-List_1, sri-PUSCH-MappingToAddModList_2, sri-PUSCH-MappingToAddModList_3). In some aspects, the mapping 440*b* of power control parameters associated with the joint SRI 410 may include a mapping of power control parameters associated with an individual SRI. For example, the mapping 440*b* may include a mapping of power control parameters associated with the first SRI field 412 and/or the second SRI field 414. That is, the mapping of power control parameters associated with the first SRI field 412 and/or the second SRI field 414 may make up a subset 442*b* of the mapping 440*b* of power control parameters associated with the joint SRI for sTRP PUSCH transmission to the second TRP (e.g., TRP 205*b*). In some instances, the mapping 440*b* may not include the power control parameter mapping associated with the first SRI field 412 and/or the second SRI field 414.

FIGS. 5A-5F illustrate transmission schemes associated with PUSCH communications according to some aspects of the present disclosure. In FIGS. 5A-5F, the x-axis represents time in some arbitrary units, the Y-axis represents frequency in some arbitrary units, and the z axis represents space in some arbitrary units. In some aspects, the UE (e.g., UE 115 or UE 900) may transmit PUSCH communications using one or more layers (e.g., data layers) on one or more beams. The data layers may be distinguished from one another based on precoding of the PUSCH communications. For example, a transmit precoding matrix indicator (TPMI) or other precoding indicator may indicate the precoding to use for each of the layers. In this regard, the UE may receive the TPMI in DCI. When the UE supports a spatial division multiplexing (SDM) scheme for uplink PUSCH communications, different spatial layers of an uplink PUSCH communication may be associated with different SRS resource sets and directed toward different TRPs. Different rank combinations, including without limitation 1+1, 1+2, 2+1, and 2+2, may be utilized for SDM mTRP communications, where different sets of layers have different transmission parameters (e.g., beam directions, power control parameters, and/or precoders). For example, in FIG. 5A, the rank of the transmission scheme may be 1+1 (e.g., one layer on each beam). The UE may transmit PUSCH communications 520*a* using a first beam, one layer associated with the first beam, and the first TRP-first SRS resource set 510*a* while transmitting PUSCH communications 530*a* using a second beam, one layer associated with the second beam, and the second TRP-second SRS resource set 510*b*.

In FIG. 5B, the rank of the transmission scheme may be 1+2 (e.g., one layer on the first beam and two layers on the second beam). The UE may transmit PUSCH communications 530*a* using a first beam, one layer associated with the first beam, and the first TRP-first SRS resource set 510*a*. The UE may transmit PUSCH communications 520*a* using a second beam, a first layer associated with the second beam, and the second TRP-second SRS resource set 510*b*. The UE may also transmit PUSCH communication 520*b* using the second beam, a second layer associated with the second beam, and the second TRP-second SRS resource set 510*b*.

In FIG. 5C, the rank of the transmission scheme may be 2+1 (e.g., two layers on the first beam and one layer on the second beam). The UE may transmit PUSCH communications 530*a* using a first beam, a first layer associated with the first beam, and the first TRP-first SRS resource set 510*a*. The UE may transmit PUSCH communications 530*b* using the first beam, a second layer associated with the first beam, and first TRP-first SRS resource set 510*a*. The UE may also transmit PUSCH communication 520*a* using the second beam, one layer associated with the second beam, and the second TRP-second SRS resource set 510*b*.

In FIG. 5D, the rank of the transmission scheme may be 2+2 (e.g., two layers on the first beam and two layers on the second beam). The UE may transmit PUSCH communications 530*a* using a first beam, a first layer associated with the first beam, and the first TRP-first SRS resource set 510*a*. The UE may transmit PUSCH communications 530*b* using the first beam, a second layer associated with the first beam, and first TRP-first SRS resource set 510*a*. The UE may also transmit PUSCH communication 520*a* using the second beam, a first layer associated with the second beam, and the second TRP-second SRS resource set 510*b*. The UE may also transmit PUSCH communication 520*b* using the second beam, a second layer associated with the second beam, and the second TRP-second SRS resource set 510b.

In FIGS. 5E and 5F, the transmission scheme may be s-TRP using a joint SRS resource set. For example, in FIG. 5E, the UE may transmit PUSCH communications 520a-520d using one or more layers. Each of the layers may use a single beam (e.g. a same beam) and first/second TRP-first joint SRS resource set 510c. In FIG. 5F, the UE may transmit PUSCH communications 530a-530d using one or more layers. Each of the layers may use a single beam (e.g. a same beam) and second TRP-second joint SRS resource set 510d.

FIGS. 6A-6F illustrate transmission schemes associated with PUSCH communications according to some aspects of the present disclosure. In FIGS. 6A-6F, the x-axis represents time in some arbitrary units, the Y-axis represents frequency in some arbitrary units, and the z axis represents space in some arbitrary units. In some aspects, the UE (e.g., UE 115 or UE 900) may transmit PUSCH communications using various transmission schemes. In some aspects, the dynamic switching field may indicate the transmission scheme. For example, the value of the dynamic switching field may indicate to the UE which mapping (e.g., a mapping associated with the joint SRI, a mapping associated with the first SRI field, and/or a mapping associated with the second SRI field) of a plurality of available mappings of codepoint values to SRS resources to use to identify the SRS resources from the SRS resource set.

In some instances, the same codepoint value (e.g., based on the joint SRI, first SRI field, or second SRI field) is used to identify both the SRS resources and the transmission parameters for the PUSCH communications. In this regard, the value of the codepoint of the dynamic switching field may indicate to the UE the transmission scheme (e.g., sTRP or mTRP), SRS resources set(s) for the PUSCH communications, and/or transmission parameters (e.g., power control parameters and/or precoding parameters). When the codepoint value of the dynamic switching field is 00 or 01, the UE may be indicated to transmit in an sTRP mode. When the codepoint value of the dynamic switching field is 10 or 11, the UE may be indicated to transmit in an mTRP mode. FIGS. 6A-6F illustrate examples of when the UE is indicated to transmit in an mTRP mode.

When the codepoint value of the dynamic switching field is 10 or 11, the UE may be indicated to transmit in an mTRP SDM mode using first and second SRS resources. For example, in FIG. 6A, the UE is configured using codepoint 10 and rank 1+1 and may transmit PUSCH communications 530a using second TRP-second SRS resource set 510b while transmitting PUSCH communications 520a using first TRP-first SRS resource set 510a. In FIG. 6B, the UE is configured using codepoint 11 and rank 1+1 and may transmit PUSCH communications 530a using second TRP-second SRS resource set 510b while transmitting PUSCH communications 520a using first TRP-first SRS resource set 510a.

In FIG. 6C, the UE is configured using codepoint 10 and rank 2+1 and may transmit PUSCH communications 530a and 530b using second TRP-second SRS resource set 510b while transmitting PUSCH communications 520a using first TRP-first SRS resource set 510a. In FIG. 6D, the UE is configured using codepoint 11 and rank 2+1 and may transmit PUSCH communications 530a using second TRP-second SRS resource set 510b while transmitting PUSCH communications 520a and 520b using first TRP-first SRS resource set 510a.

In FIG. 6E, the UE is configured using codepoint 10 and rank 2+2 and may transmit PUSCH communications 520a and 520b using second TRP-second SRS resource set 510b while transmitting PUSCH communications 530a and 530b using first TRP-first SRS resource set 510a. In FIG. 6F, the UE is configured using codepoint 11 and rank 2+2 and may transmit PUSCH communications 530a and 530b using second TRP-second SRS resource set 510b while transmitting PUSCH communications 520a and 520b using first TRP—first SRS resource set 510a.

Figure 7:
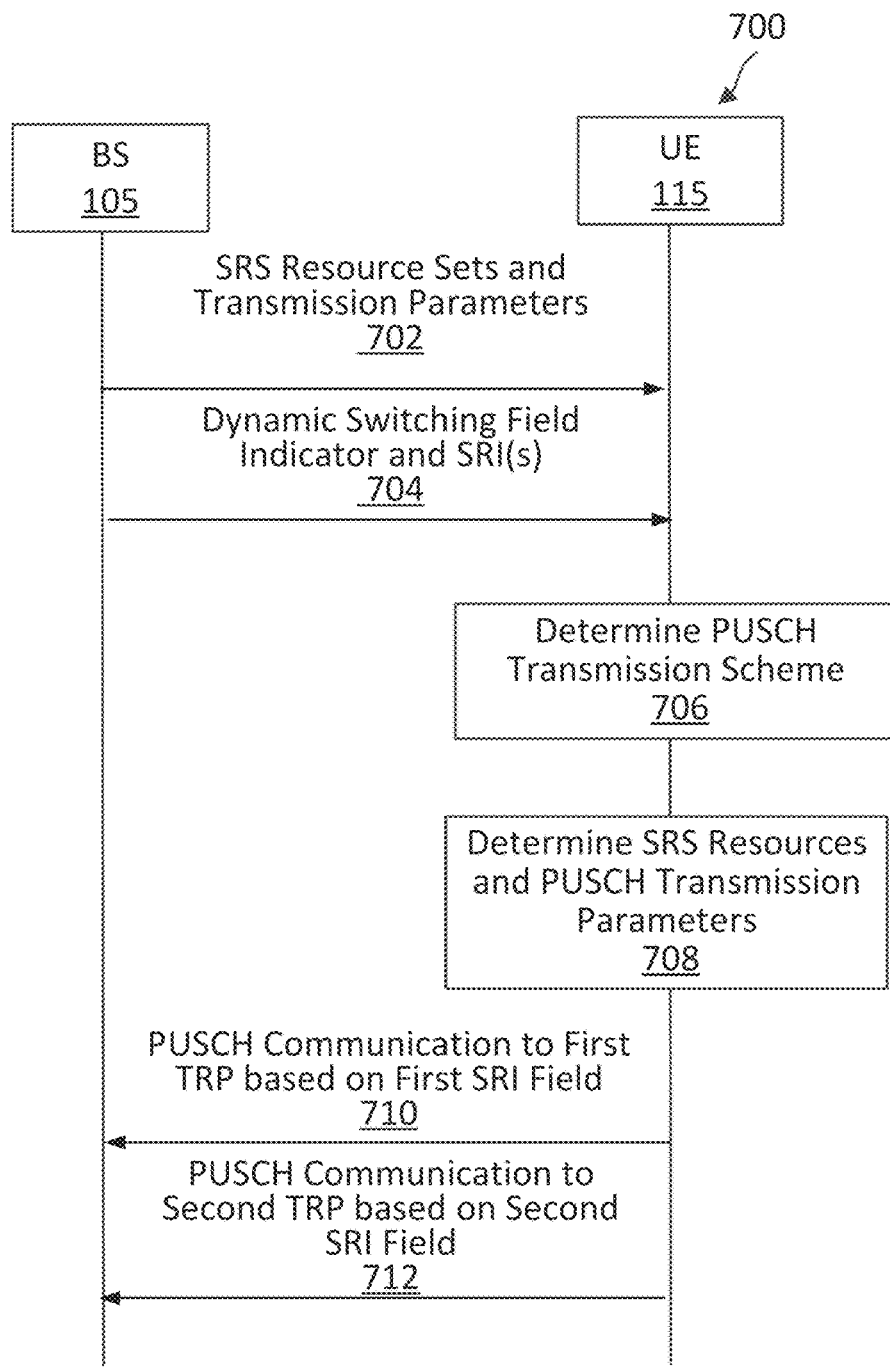
FIG. 7 is a signaling diagram of a communication method according to some aspects of the present disclosure.

FIG. 7 is a signaling diagram of a communication method 700 according to some aspects of the present disclosure. At action 702, the method 700 includes the BS 105 transmitting SRS resource sets and transmission parameters to the UE 115. In this regard, the BS 105 may transmit the SRS resource sets and transmission parameters to the UE 115 in DCI and/or RRC messaging. The UE 115 may be configured by the BS 105 with multiple SRS resource sets (e.g., one SRS resource set for codebook-based communications and one or more SRS resource sets for non-codebook-based communications). Each SRS resource or group may include time domain resources, spatial domain resources, and/or frequency domain resources including symbols, slots, frames, sub-frames, transmission time intervals, beams (e.g., directional beams), resource elements, resources blocks, subchannels, frequency bands, subbands, coresets, bandwidth parts, or a combination thereof. In some aspects, the transmission parameters may include power control parameters, such as a P0 value, an Alpha value for open-loop power control through sri-P0-PUSCH-AlphaSetID, a pathloss value through sri-PUSCH-PathlossReferenceRS-ID, a closed-loop power control index value through sri-PUSCH-ClosedLoopIndex, and/or other power control parameters, and/or precoding parameters (e.g., TPMI).

At action 704, the method 700 includes the BS 105 transmitting a dynamic switching field and one or more SRIs to the UE 115. The value of the dynamic switching field may indicate to the UE 115 which mapping or SRS resource set (e.g., a mapping/SRS resource set associated with the first SRI field, a mapping/SRS resource set associated with the second SRI field, and/or a mapping/SRS resource set associated with a joint SRI) of a plurality of available mappings of codepoint values to SRS resources to use to identify the SRS resources. Likewise, the value of the dynamic switching field may indicate to the UE 115 which mapping (e.g., a mapping associated with the first SRI field, a mapping associated with the second SRI field, and/or a mapping associated with a joint SRI) of a plurality of available mappings of codepoint values to transmission parameters to use to identify the transmission parameters. In some instances, the same codepoint value is used to identify both the SRS resources and the transmission parameters for the PUSCH communications. In some instances, in the context of SDM the dynamic switching field may comprise 2 bits and have four associated codepoint values (i.e., 00, 01, 10, and 11), as described in further detail below in the context of Table 1.

At action 706, the method 700 includes the UE 115 determining a PUSCH transmission scheme. In this regard, the value of the codepoint of the dynamic switching field may indicate to the UE whether mTRP or sTRP communication should be used. In some instances, a codepoint value of 00 or 01 indicates to the UE that the transmission scheme is sTRP (e.g., 00 to indicate communications to a first TRP and 01 to indicate communications to a second TRP), while a codepoint of 10 or 11 indicates to the UE that the transmission scheme is mTRP (e.g., 10 to indicate an order of first TRP, second TRP (see, for example, FIG. 6E) and 11 to indicate an order of second TRP, first TRP (see, for example, FIG. 6F)).

At action 708, the method 700 includes the UE 115 determining the SRS resources and PUSCH transmission parameters. In this regard, the value of the codepoint of the dynamic switching field may indicate to the UE 115 the SRS resources set(s) and/or transmission parameters (e.g., power control parameters and/or precoding parameters) for the PUSCH communications. When the codepoint value of the dynamic switching field is 10, the UE 115 may be indicated to transmit in an mTRP SDM mode using first and second SRS resource sets (e.g., first and second codebook SRS resource sets or first and second non-codebook SRS resource sets) based on the first and second SRI fields and first and second TPMI fields (or other precoder indicators). Accordingly, the UE 115 can determine the appropriate SRS resources and/or power control parameters to use for the SDM PUSCH transmissions to the first TRP based on the codepoint value of the first SRI field and the associated mappings to SRS resources and power control parameters (e.g., sri-PUSCH-MappingToAddModList_1) for that codepoint value. Similarly, the UE 115 can determine the appropriate SRS resources and/or power control parameters to use for the SDM PUSCH transmissions to the second TRP based on the codepoint value of the second SRI field and the associated mappings to SRS resources and power control parameters (e.g., sri-PUSCH-MappingToAddModList_2) for that codepoint value. For example, the first SRI field and the second SRI field may each include 4 bits. The 4 bits of the first SRI field and the 4 bits of the second SRI field may each indicate one of up to 16 different codepoint values. The 16 different codepoint values may be mapped to SRS resources (e.g., an SRS resource mapping as shown in FIG. 3) and/or power control parameters (e.g., a power control parameter mapping as shown in FIG. 3). For example, the first SRI field may be mapped to 16 sets of power control parameters in a first power control parameter mapping (sri-PUSCH-MappingToAddModList_1) while the second SRI field may be mapped to 16 sets of power control parameters in a second power control parameter mapping (sri-PUSCH-MappingToAddModList_2). Each of the two sets of 16 power control parameters in the power control parameter mappings may include the same or may include different power control parameters. The UE 115 may utilize a first TPMI field (or other precoder indicator) to determine the precoding for the SDM PUSCH transmissions to the first TRP and a second TPMI field (or other precoder indicator) to determine the precoding for the SDM PUSCH transmissions to the second TRP. The codepoint value 10 may be associated with an ordering of the TRPs being the first TRP followed by the second TRP, or vice versa.

When the codepoint value of the dynamic switching field is 11, the UE 115 may be indicated to transmit in an mTRP SDM mode using first and second SRS resource sets (e.g., first and second codebook SRS resource sets or first and second non-codebook SRS resource sets) based on the first and second SRI fields and first and second TPMI fields (or other precoder indicators). Accordingly, in some instances the UE 115 can determine the appropriate SRS resources and/or power control parameters to use for the SDM PUSCH transmissions to the first TRP based on the codepoint value of the first SRI field and the associated mappings to SRS resources and power control parameters (e.g., sri-PUSCH-MappingToAddModList_1) for that codepoint value. Similarly, the UE 115 can determine the appropriate SRS resources and/or power control parameters to use for the SDM PUSCH transmissions to the second TRP based on the codepoint value of the second SRI field and the associated mappings to SRS resources and power control parameters (e.g., sri-PUSCH-MappingToAddModList_2) for that codepoint value. The UE 115 may utilize a first TPMI field (or other precoder indicator) to determine the precoding for the SDM PUSCH transmissions to the first TRP and a second TPMI field (or other precoder indicator) to determine the precoding for the SDM PUSCH transmissions to the second TRP. The codepoint value 11 may be associated with an ordering of the TRPs being the second TRP followed by the first TRP, or vice versa. In some instances, the ordering of the TRPs for codepoint value 11 is the opposite of the ordering for the codepoint value 10.

At action 710, the method 700 includes the UE 115 transmitting a PUSCH communication to a first TRP based on the SRS resources and transmission parameters determined at action 708.

At action 712, the method 700 includes the UE 115 transmitting a PUSCH to a second TRP based on the SRS resources and transmission parameters determined at action 708. In some aspects, action 712 may be performed simultaneously with action 710. In this regard, the PUSCH communication transmitted to the first TRP, at action 710, and the PUSCH communication transmitted to the second TRP, at action 712, may be spatial division multiplexed.

Figure 8:
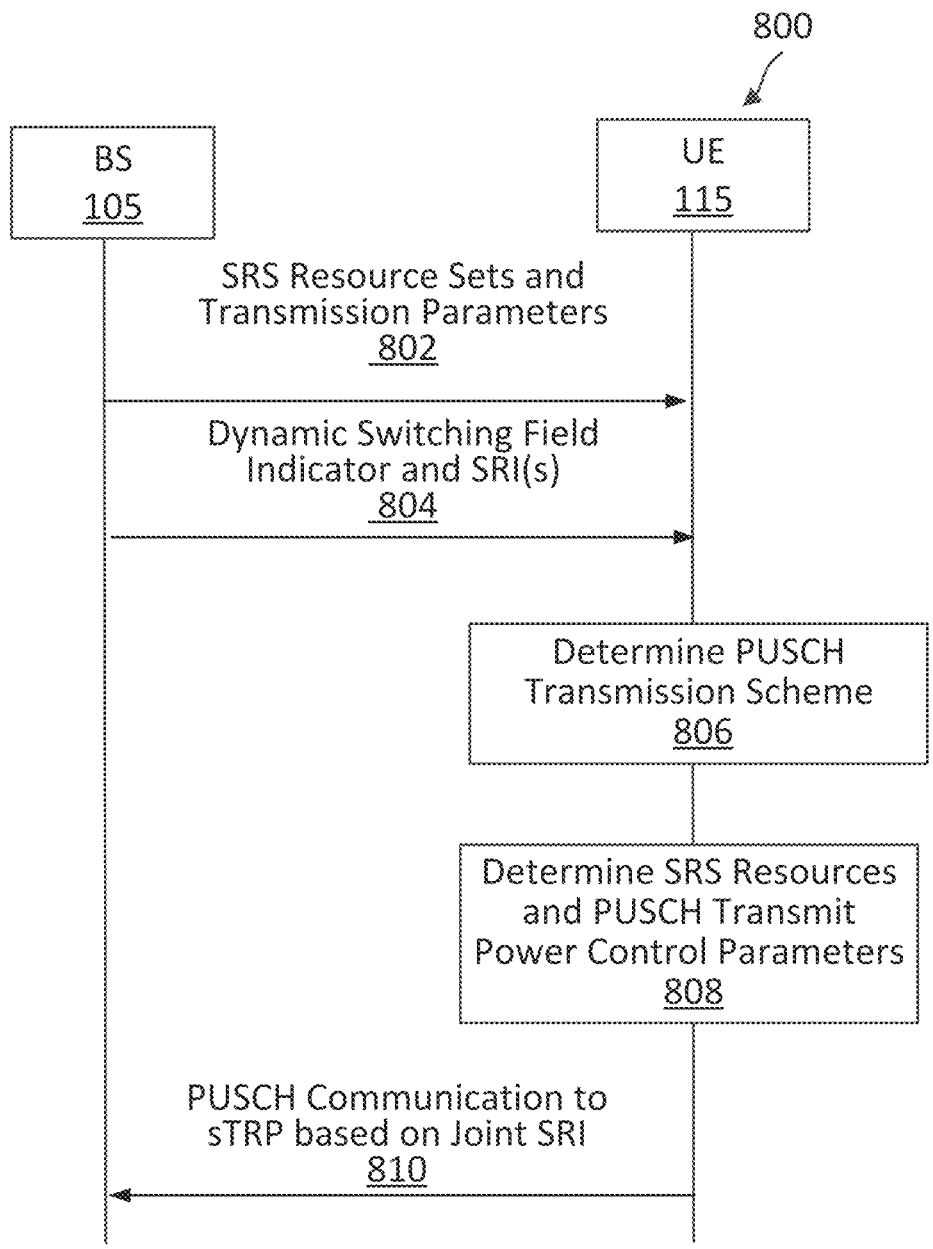
FIG. 8 is a signaling diagram of a communication method according to some aspects of the present disclosure.

FIG. 8 is a signaling diagram of a communication method 800 according to some aspects of the present disclosure. The communication method 800 may include aspects similar to aspects of the communication method 700 described above. At action 802, the method 800 includes the BS 105 transmitting SRS resource sets and transmission parameters to the UE 115. In this regard, the BS 105 may transmit the SRS resource sets and transmission parameters to the UE 115 in DCI and/or RRC messaging. In some instances, the BS transmits to the UE three or more SRS resource sets (e.g., an SRS resource set associated with a first SRI field, an SRS resource set associated with a second SRI field, an SRS resource set associated with a joint SRI, an SRS resource set associated with a joint SRI for communications to a first TRP, and/or an SRS resource set associated with a joint SRI for communications to a second TRP) and/or three or more mappings of power control parameters (e.g., sri-PUSCH-MappingToAddModList_1, sri-PUSCH-MappingToAddModList_2, sri-PUSCH-MappingToAddModList_3, and/or sri-PUSCH-MappingToAddModList_4).

At action 804, the method 800 includes the BS 105 transmitting a dynamic switching field and SRIs to the UE 115. The value of the dynamic switching field may indicate to the UE 115 which mapping or SRS resource set (e.g., a mapping/SRS resource set associated with the first SRI field, a mapping/SRS resource set associated with the second SRI field, and/or a mapping/SRS resource set associated with a joint SRI), of a plurality of available mappings of codepoint values to SRS resources to use to identify the SRS resources. Likewise, the value of the dynamic switching field may indicate to the UE 115 which mapping (e.g., a mapping associated with the first SRI field, a mapping associated with the second SRI field, and/or a mapping associated with a joint SRI) of a plurality of available mappings of codepoint values to transmission parameters to use to identify the transmission parameters. In some instances, the same codepoint value is used to identify both the SRS resources and the transmission parameters for the PUSCH communications.

At action 806, the method 800 includes the UE 115 determining the PUSCH transmission scheme. In this regard, in FIG. 8 the value of the codepoint of the dynamic switching field may be 00 or 01 indicating to the UE 115 the transmission scheme is sTRP.

At action 808, the method 800 includes the UE 115 determining the SRS resources and PUSCH transmission parameters. In this regard, the value of the codepoint of the dynamic switching field (e.g., 00 or 01) may indicate to the UE 115 the SRS resources set(s) and/or transmission parameters (e.g., power control parameters and/or precoding parameters) for the PUSCH communications.

When the codepoint value of the dynamic switching field is 00, the UE 115 may be indicated to transmit in an sTRP mode using a first SRS resource set (e.g., a first codebook SRS resource set or a first non-codebook SRS resource set) associated with a first TRP based on the joint SRI and a TPMI field (or other precoder indicator). Accordingly, in some instances the UE 115 can determine the appropriate SRS resources and/or power control parameters to use for the sTRP PUSCH transmissions to the first TRP based on the codepoint value of the joint SRI and the associated mappings to SRS resources and power control parameters (e.g., sri-PUSCH-MappingToAddModList_3) for that codepoint value. For example, the joint SRI may include 8 bits. The 8 bits of the joint SRI may indicate one of up to 256 different codepoint values. The 256 different codepoint values may be mapped to SRS resources (e.g., an SRS resource mapping as shown in FIGS. 4A and 4B) and/or power control parameters (e.g., a power control parameter mapping as shown in FIGS. 4A and 4B) for the sTRP PUSCH transmissions to the first TRP.

When the codepoint value of the dynamic switching field is 01, the UE 115 may be indicated to transmit in an sTRP mode using a second SRS resource set (e.g., a second codebook SRS resource set or a second non-codebook SRS resource set) associated with a second TRP (different than the first TRP) based on the joint SRI and a TPMI field (or other precoder indicator). Accordingly, in some instances the UE 115 can determine the appropriate SRS resources and/or power control parameters to use for the sTRP PUSCH transmissions to the second TRP based on the codepoint value of the joint SRI and the associated mappings to SRS resources and power control parameters (e.g., sri-PUSCH-MappingToAddModList_3 or sri-PUSCH-MappingToAddModList_4) for that codepoint value. For example, the joint SRI may include 8 bits. The 8 bits of the joint SRI may indicate one of up to 256 different codepoint values. The 256 different codepoint values may be mapped to SRS resources (e.g., an SRS resource mapping as shown in FIGS. 4A and 4B) and/or power control parameters (e.g., a power control parameter mapping as shown in FIGS. 4A and 4B) for the sTRP PUSCH transmissions to the second TRP.

At action 810, the method 800 includes the UE 115 transmitting one or more PUSCH communications to an sTRP based on the SRS resources and transmission parameters determined at action 808.

Figure 9:
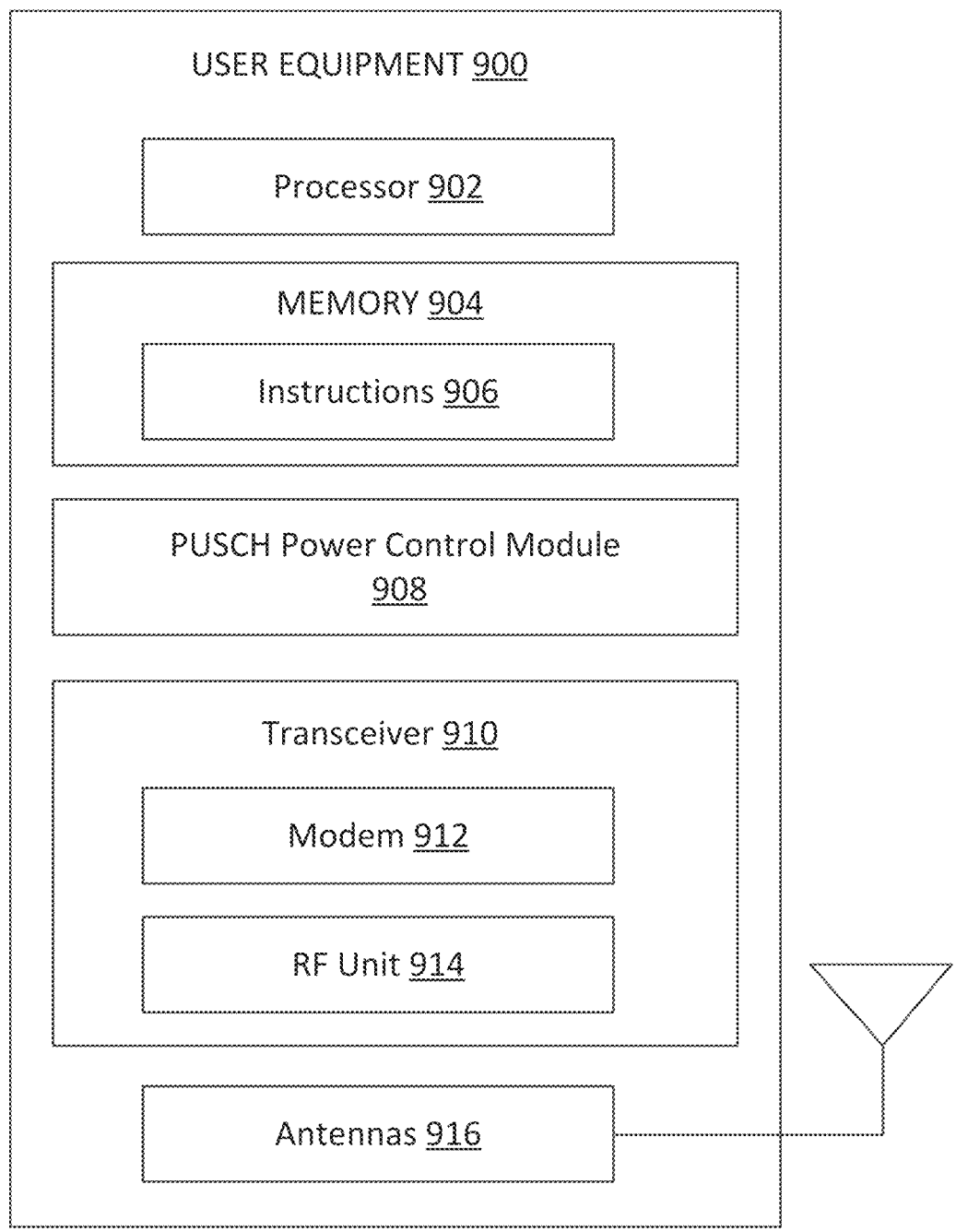
FIG. 9 is a block diagram of an exemplary user equipment (UE) according to some aspects of the present disclosure.

FIG. 9 is a block diagram of an exemplary UE 900 according to some aspects of the present disclosure. The UE 900 may be the UE 115 in the network 100 or 200 as discussed above. As shown, the UE 900 may include a processor 902, a memory 904, a PUSCH power control module 908, a transceiver 910 including a modem subsystem 912 and a radio frequency (RF) unit 914, and one or more antennas 916. These elements may be coupled with each other and in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 904 includes a non-transitory computer-readable medium. The memory 904 may store instructions 906. The instructions 906 may include instructions that, when executed by the processor 902, cause the processor 902 to perform the operations described herein with reference to the UEs 115 in connection with aspects of the present disclosure, for example, aspects of FIGS. 2-8 and 11-12. Instructions 906 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PUSCH power control module 908 may be implemented via hardware, software, or combinations thereof. For example, the PUSCH power control module 908 may be implemented as a processor, circuit, and/or instructions 906 stored in the memory 904 and executed by the processor 902.

In some aspects, the PUSCH power control module 908 may be configured to receive, from a base station (B S), a joint sounding reference signal (SRS) resource indicator (SRI). The joint SRI may include a first SRI field and a second SRI field. The PUSCH power control module 908 may be configured to transmit, to a transmission/reception point (TRP), one or more physical uplink shared channel (PUSCH) communications based on SRS resources and transmission parameters using the joint SRI.

As shown, the transceiver 910 may include the modem subsystem 912 and the RF unit 914. The transceiver 910 can be configured to communicate bi-directionally with other devices, such as the BSs 105 and/or the UEs 115. The modem subsystem 912 may be configured to modulate and/or encode the data from the memory 904 and the PUSCH power control module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The antennas 916 may include multiple antennas of similar or different designs in order to sustain multiple transmission links. The RF unit 914 may configure the antennas 916.

In some instances, the UE 900 can include multiple transceivers 910 implementing different RATs (e.g., NR and LTE). In some instances, the UE 900 can include a single transceiver 910 implementing multiple RATs (e.g., NR and LTE). In some instances, the transceiver 910 can include various components, where different combinations of components can implement RATs.

In some aspects, the processor 902 may be coupled to the memory 904, the PUSCH power control module 908, and/or the transceiver 910. The processor 902 and may execute operating system (OS) code stored in the memory 904 in order to control and/or coordinate operations of the PUSCH power control module 908 and/or the transceiver 910. In some aspects, the processor 902 may be implemented as part of the PUSCH power control module 908.

Figure 10:
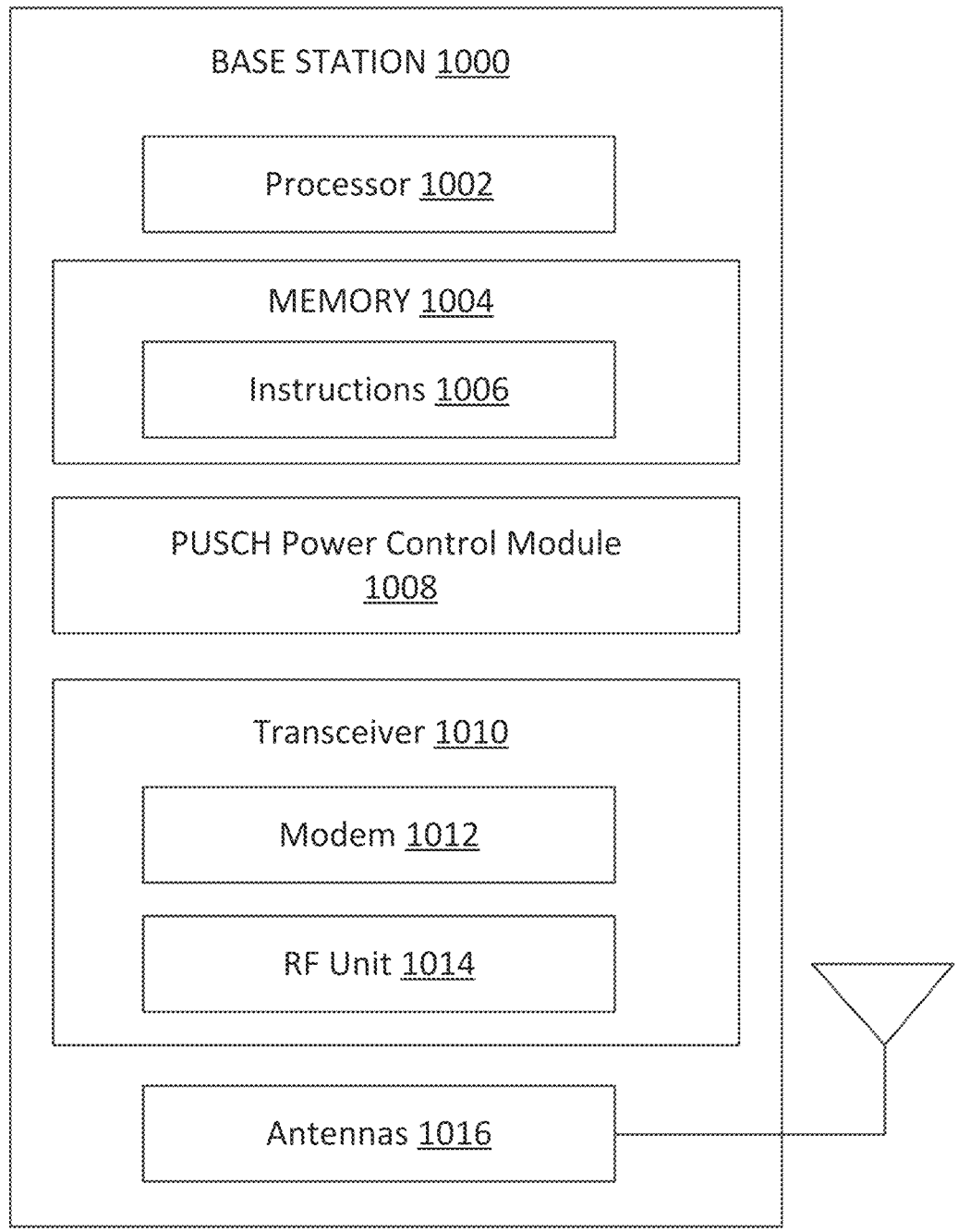
FIG. 10 is a block diagram of an exemplary base station (BS) according to some aspects of the present disclosure.

FIG. 10 is a block diagram of an exemplary BS 1000 according to some aspects of the present disclosure. The BS 1000 may be a BS 105 as discussed above. As shown, the BS 1000 may include a processor 1002, a memory 1004, a PUSCH power control module 1008, a transceiver 1010 including a modem subsystem 1012 and a RF unit 1014, and one or more antennas 1016. These elements may be coupled with each other and in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 2-8 and 11-12. Instructions 1006 may also be referred to as code, which may be interpreted broadly to include any type of computer-readable statement(s).

The PUSCH power control module 1008 may be implemented via hardware, software, or combinations thereof. For example, the PUSCH power control module 1008 may be implemented as a processor, circuit, and/or instructions 1006 stored in the memory 1004 and executed by the processor 1002.

The PUSCH power control module 1008 may be used for various aspects of the present disclosure, for example, aspects of FIGS. 2-8 and 11-12. In some aspects, the PUSCH power control module 1008 may be configured to transmit, to a user equipment (UE), a joint sounding reference signal (SRS) resource indicator (SRI). The joint SRI may include a first SRI field and a second SRI field. The PUSCH power control module 908 may be configured to receive, via a transmission/reception point (TRP), one or more physical uplink shared channel (PUSCH) communications based on SRS resources and transmission parameters using the joint SRI.

Additionally or alternatively, the PUSCH power control module 1008 can be implemented in any combination of hardware and software, and may, in some implementations, involve, for example, processor 1002, memory 1004, instructions 1006, transceiver 1010, and/or modem 1012.

As shown, the transceiver 1010 may include the modem subsystem 1012 and the RF unit 1014. The transceiver 1010 can be configured to communicate bi-directionally with other devices, such as the UEs 115 and/or 900. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data from the modem subsystem 1012 (on outbound transmissions) or of transmissions originating from another source such as a UE 115 or UE 900. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 1000 to enable the BS 1000 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, a configuration indicating a plurality of sub-slots within a slot according to aspects of the present disclosure. The antennas 1016 may further receive data messages transmitted from other devices and provide the received data messages for processing and/or demodulation at the transceiver 1010. The antennas 1016 may include multiple antennas of similar or different designs in order to sustain multiple transmission links.

In some instances, the BS 1000 can include multiple transceivers 1010 implementing different RATs (e.g., NR and LTE). In some instances, the BS 1000 can include a single transceiver 1010 implementing multiple RATs (e.g., NR and LTE). In some instances, the transceiver 1010 can include various components, where different combinations of components can implement RATs.

In some aspects, the processor 1002 may be coupled to the memory 1004, the PUSCH power control module 1008, and/or the transceiver 1010. The processor 1002 may execute OS code stored in the memory 1004 to control and/or coordinate operations of the PUSCH power control module 1008, and/or the transceiver 1010. In some aspects, the processor 1002 may be implemented as part of the PUSCH power control module 1008. In some aspects, the processor 1002 is configured to transmit via the transceiver 1010, to a UE, an indicator indicating a configuration of sub-slots within a slot.

Figure 11:
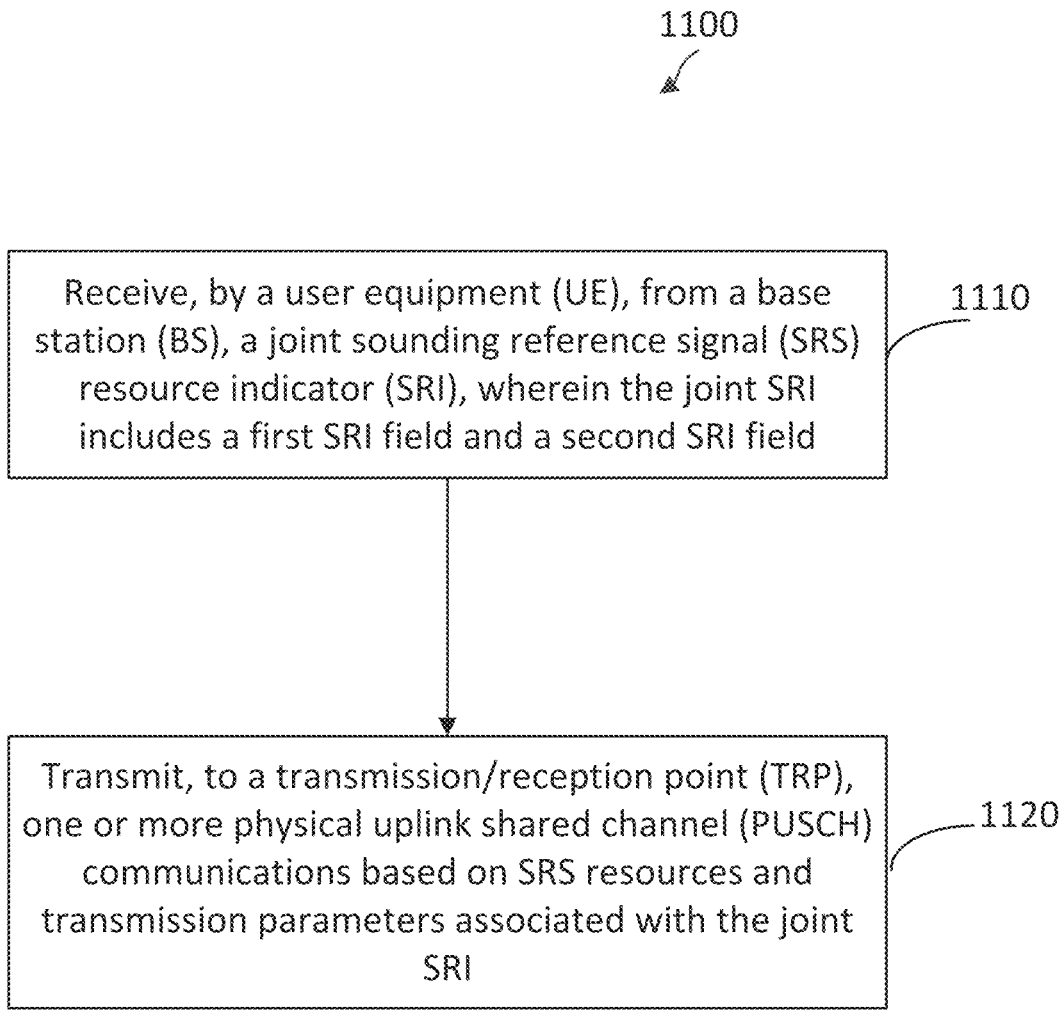
FIG. 11 is a flow diagram of a communication method according to some aspects of the present disclosure.

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the actions. For example, a wireless communication device, such as the UE 115 or the UE 900, may utilize one or more components, such as the processor 902, the memory 904, the PUSCH power control module 908, the transceiver 910, the modem 912, and the one or more antennas 916, to execute aspects of method 1100. The method 1100 may employ similar mechanisms as in the networks 100 and 200 and the aspects and actions described with respect to FIGS. 2-8. As illustrated, the method 1100 includes a number of enumerated actions, but the method 1100 may include additional actions before, after, and in between the enumerated actions. In some aspects, one or more of the enumerated actions may be omitted or performed in a different order.

At action 1110, the method 1100 includes a UE (e.g., the UE 115 or the UE 900) receiving, from a base station (BS), a joint sounding reference signal (SRS) resource indicator (SRI). The UE may receive the joint SRI from the BS in downlink control information (DCI), MAC-CE, RRC message, and/or another suitable communication or information element. The joint SRI may comprise a plurality of bits (e.g., 4 bits, 6 bits, 8 bits, 12 bits, 16 bits, 24 bits, 32 bits, or other suitable number of bits). In some instances, the joint SRI can include a first SRI field and a second SRI field, each of the first SRI field and the second SRI field having a plurality of bits. For example, the joint SRI can include a total number of bits (e.g., 4 bits, 6 bits, 8 bits, 12 bits, 16 bits, 24 bits, 32 bits, or other suitable number of bits) equal to the number of bits in the first SRI field (e.g., 2 bits, 3 bits, 4 bits, 6 bits, 8 bits, 12 bits, 16 bits, or other suitable number of bits) plus the number of bits in the second SRI field (e.g., 2 bits, 3 bits, 4 bits, 6 bits, 8 bits, 12 bits, 16 bits, or other suitable number of bits). The first and second SRI fields may have an equal number of bits or a different number of bits. The joint SRI may comprise a concatenation of two or more SRI fields (e.g., a concatenation of the first SRI field and the second SRI field). In some instances, the first SRI field and/or the second SRI field may itself be an SRI.

In some aspects, the SRS resource set (e.g., a third SRS resource set sri-PUSCH-MappingToAddModList_3 which may include 8 SRS resources) may be indicated by the joint SRI. For example, the 8 bits of the joint SRI may map to 256 SRS resource groupings of the 8 SRS resources associated with the 256 codepoints for non-codebook based PUSCH communications. In some aspects, the 8 SRS resources in the SRS resource set may include the 4 SRS resources from the first SRS resource set and the 4 SRS resources from the second SRS resource set. In some aspects, the 8 SRS resources may be different from the 4 SRS resources in the first SRS resource set and the 4 SRS resources in the second SRS resource set.

As discussed in greater detail below, a codepoint value of the joint SRI, a codepoint value of the first SRI field, and/or a codepoint value of the second SRI field may be utilized by the UE to determine the SRS resources and/or transmission parameters, including without limitation power control parameters, such as a P0 value, an Alpha value, a set of P0 and alpha values for open-loop power control through sri-P0-PUSCH-AlphaSetId, a pathloss value through sri-PUSCH-PathlossReferenceRS-ID, a closed-loop power control index value through sri-PUSCH-ClosedLoopIndex, and/or other power control parameters, and/or precoding parameters (e.g., TPMI).

In some aspects, the UE may be configured by the BS with multiple SRS resource sets (e.g., one SRS resource set for codebook-based communications and one or more SRS resource sets for non-codebook-based communications). Each SRS resource or group may include time domain resources, spatial domain resources, and/or frequency domain resources including symbols, slots, frames, subframes, transmission time intervals, beams (e.g., directional beams), resource elements, resources blocks, subchannels, frequency bands, subbands, coresets, bandwidth parts, or a combination thereof. The UE may receive an indication of the SRS resource sets from the BS via radio resource control (RRC) signaling or other suitable signaling.

In some aspects, the UE may transmit one or more PUSCH communications to one or more transmission/reception points (TRPs) using codebook-based PUSCH communications and/or non-codebook-based PUSCH communications. The SRS resources and/or transmission parameters (e.g., power control parameters, precoding parameters, etc.) indicated by the joint SRI, first SRI field, and/or second SRI field received at action 1110 may be based on the type of uplink communications (e.g., codebook-based or non-codebook-based).

For codebook-based PUSCH communications, the UE may receive control signaling (e.g., RRC signaling) from the BS that indicates to use one SRS resource set for codebook-based PUSCH communications (e.g., an SRS resource set with "usage" set to "codebook"). The UE may be configured with one SRS resources set for code-book-based PUSCH communications. For non-codebook-based PUSCH communications, the UE may receive control signaling (e.g., RRC signaling) that indicates to use an SRS resource set for non-codebook-based PUSCH (e.g., an SRS resource set with "usage" set to "non-codebook"). The UE may be configured with multiple SRS resources sets (e.g., 2, 3, etc.) for non-code-book-based PUSCH communications. For both codebook-based and non-codebook-based PUSCH communications, the indicated SRS resource set may include a first quantity of SRS resources for use by the UE (e.g., a maximum of four SRS resources, or other suitable quantity of resources). Each SRS resource or SRS resource group in an SRS resource set may be associated with a number of antenna ports (e.g., nrofSRS-Ports, 1 port, 2 ports, 3 ports, etc.). In some aspects, the joint SRI, the first SRI field, and/or the second SRI field in the DCI, the MAC-CE, and/or the RRC message may indicate one or more SRS resources from the SRS resource set.

In some instances, a codepoint value of the joint SRI, the first SRI field, and/or the second SRI field may be utilized by the UE to identify the SRS resources and/or transmission parameters (e.g., power control parameters, precoding parameters, etc.) for PUSCH communications. In some instances, the UE may utilize a mapping of codepoint values to SRS resources to identify the corresponding SRS resources. Similarly, the UE may utilize a mapping of codepoint values to transmission parameters to identify the corresponding transmission parameters, including power control parameters and/or precoding parameters.

In some instances, the UE may determine whether to use a codepoint value of the joint SRI, a codepoint value of the first SRI field, and/or a codepoint value of the second SRI field to identify the one or more SRS resources and/or transmission parameters based on an indication from the BS. In some instances, the indication may be a value of a dynamic switching field of the DCI, the MAC-CE, and/or the RRC signaling. For example, the value of the dynamic switching field may indicate to the UE which mapping (e.g., a mapping associated with the joint SRI, a mapping associated with the first SRI field, and/or a mapping associated with the second SRI field) of a plurality of available mappings of codepoint values to SRS resources to use to identify the SRS resources from the SRS resource set. Likewise, the value of the dynamic switching field may indicate to the UE which mapping (e.g., a mapping associated with the joint SRI, a mapping associated with the first SRI field, and/or a mapping associated with the second SRI field) of a plurality of available mappings of codepoint values to transmission parameters to use to identify the transmission parameters. In some instances, the same codepoint value (e.g., based on the joint SRI, first SRI field, or second SRI field) is used to identify both the SRS resources and the transmission parameters for the PUSCH communications.

The UE may receive the plurality of mappings of codepoint values to SRS resources and/or the plurality of mappings of codepoint values to transmission parameters from the BS via radio resource control (RRC) signaling or other suitable signaling. In some instances, the mappings of codepoint values to transmission parameters includes a plurality of mappings of codepoint values to power control parameters (e.g., sri-PUSCH-MappingToAddModList_1, sri-PUSCH-MappingToAddModList_2, sri-PUSCH-MappingToAddModList_3, sri-PUSCH-MappingToAddModList_4, etc.).

The UE may select the appropriate mapping(s) to use based on a codepoint value of the dynamic switching field indicated in the DCI, MAC-CE, and/or RRC signaling or other indication from the BS. For example, in the context of SDM the dynamic switching field may comprise 2 bits and have four associated codepoint values (i.e., 00, 01, 10, and 11). Each codepoint value may be associated with a transmission scheme (sTRP or mTRP), one or more SRS resource set(s), one or more SRIs (e.g., the joint SRI, the first SRI field, and/or the second SRI field), and/or one or more precoders (e.g., a TPMI field(s)).

In some aspects, to support switching between sTRP and mTRP PUSCH communications in the presence of SDM, the DCI, MAC-CE, and/or RRC signaling may include a dynamic switching field that is configured to indicate an arrangement for switching between the different transmission schemes for the uplink PUSCH communications. A codepoint value of the dynamic switching field (e.g., a two-bit field) as shown in Table 1 may indicate whether the UE is configured to transmit the uplink PUSCH communications based on the first SRI field, the second SRI field, and/or the joint SRI. Based on the codepoint value and/or indicated SRI, the UE can select and/or utilize the associated mappings to SRS resources and/or transmission parameters. In this regard, in some aspects the value of the codepoint of the dynamic switching field may indicate to the UE the transmission scheme (e.g., sTRP or mTRP), SRS resources set(s) for the PUSCH communications, and/or transmission parameters (e.g., power control parameters and/or precoding parameters). Likewise, the value of the codepoint of the dynamic switching field may indicate to the UE which mapping(s) of SRS resources and/or transmission parameters to use to determine the SRS resources and transmission parameters for the PUSCH communications.

TABLE 1

Transmission Schemes for sTRP and mTRP SDM PUSCH

| Dynamic Switching Field | SRS Resource Set(s) | SRI (for CB and non-CB)/TPMI (CB only) fields |
|---|---|---|
| 00 | s-TRP mode with $1^{st}$ SRS Resource Set (TRP1) | Joint SRI/ TPMI field |
| 01 | s-TRP mode with $2^{nd}$ SRS Resource Set (TRP2) | Joint SRI/ TPMI field |
| 10 | m-TRP mode with (TRP1, TRP2) order $1^{st}$ SRI/TPMI field: $1^{st}$ SRS Resource Set $2^{nd}$ SRI/TPMI field: $2^{nd}$ SRS Resource Set | Both $1^{st}$ and $2^{nd}$ SRI/ TPMI fields |
| 11 | m-TRP mode with (TRP2, TRP1) order $1^{st}$ SRI/TPMI field: $1^{st}$ SRS Resource Set $2^{nd}$ SRI/TPMI field: $2^{nd}$ SRS Resource Set | Both $1^{st}$ and $2^{nd}$ SRI/ TPMI fields |

As shown in the example of Table 1, when the codepoint value of the dynamic switching field is 00, the UE may be indicated to transmit in an sTRP mode using a first SRS resource set (e.g., a first codebook SRS resource set or a first non-codebook SRS resource set) associated with a first TRP based on the joint SRI and a TPMI field (or other precoder indicator). Accordingly, in some instances the UE can determine the appropriate SRS resources and/or power control parameters to use for the sTRP PUSCH transmissions to the first TRP based on the codepoint value of the joint SRI and the associated mappings to SRS resources and power control parameters (e.g., sri-PUSCH-MappingToAddModList_3) for that codepoint value. For example, the joint SRI may include 8 bits. The 8 bits of the joint SRI may indicate one of up to 256 different codepoint values. The 256 different codepoint values may be mapped to SRS resources (e.g., an SRS resource mapping as shown in FIGS. 4A and 4B) and/or power control parameters (e.g., a power control parameter mapping as shown in FIGS. 4A and 4B) for the sTRP PUSCH transmissions to the first TRP.

When the codepoint value of the dynamic switching field is 01, the UE may be indicated to transmit in an sTRP mode using a second SRS resource set (e.g., a second codebook SRS resource set or a second non-codebook SRS resource set) associated with a second TRP (different than the first TRP) based on the joint SRI and a TPMI field (or other precoder indicator). Accordingly, in some instances the UE can determine the appropriate SRS resources and/or power control parameters to use for the sTRP PUSCH transmissions to the second TRP based on the codepoint value of the joint SRI and the associated mappings to SRS resources and power control parameters (e.g., sri-PUSCH-MappingToAddModList_3 or sri-PUSCH-MappingToAddModList_4) for that codepoint value. For example, the joint SRI may include 8 bits. The 8 bits of the joint SRI may indicate one of up to 256 different codepoint values. The 256 different codepoint values may be mapped to SRS resources (e.g., an SRS resource mapping as shown in FIGS. 4A and 4B) and/or power control parameters (e.g., a power control parameter mapping as shown in FIGS. 4A and 4B) for the sTRP PUSCH transmissions to the second TRP.

When the codepoint value of the dynamic switching field is 10, the UE may be indicated to transmit in an mTRP SDM mode using first and second SRS resource sets (e.g., first and second codebook SRS resource sets or first and second non-codebook SRS resource sets) based on the first and second SRI fields and first and second TPMI fields (or other precoder indicators). Accordingly, in some instances the UE can determine the appropriate SRS resources and/or power control parameters to use for the SDM PUSCH transmissions to the first TRP based on the codepoint value of the first SRI field and the associated mappings to SRS resources and power control parameters (e.g., sri-PUSCH-MappingToAddModList_1) for that codepoint value. Similarly, the UE can determine the appropriate SRS resources and/or power control parameters to use for the SDM PUSCH transmissions to the second TRP based on the codepoint value of the second SRI field and the associated mappings to SRS resources and power control parameters (e.g., sri-PUSCH-MappingToAddModList_2) for that codepoint value. For example, the first SRI field and the second SRI field may each include 4 bits. The 4 bits of the first SRI field and the 4 bits of the second SRI field may each indicate one of up to 16 different codepoint values. The 16 different codepoint values may be mapped to SRS resources (e.g., an SRS resource mapping as shown in FIG. 3) and/or power control parameters (e.g., a power control parameter mapping as shown in FIG. 3). For example, the first SRI field may be mapped to 16 sets of power control parameters in a first power control parameter mapping (sri-PUSCH-MappingToAddModList_1) while the second SRI field may be mapped to 16 sets of power control parameters in a second power control parameter mapping (sri-PUSCH-MappingToAddModList_2). Each of the two sets of 16 power control parameters in the power control parameter mappings may include the same or may include different power control parameters. The UE may utilize a first TPMI field (or other precoder indicator) to determine the precoding for the SDM PUSCH transmissions to the first TRP and a second TPMI field (or other precoder indicator) to determine the precoding for the SDM PUSCH transmissions to the second TRP. The codepoint value 10 may be associated with an ordering of the TRPs being the first TRP followed by the second TRP, or vice versa.

When the codepoint value of the dynamic switching field is 11, the UE may be indicated to transmit in an mTRP SDM mode using first and second SRS resource sets (e.g., first and second codebook SRS resource sets or first and second non-codebook SRS resource sets) based on the first and second SRI fields and first and second TPMI fields (or other precoder indicators). Accordingly, in some instances the UE can determine the appropriate SRS resources and/or power control parameters to use for the SDM PUSCH transmissions to the first TRP based on the codepoint value of the first SRI field and the associated mappings to SRS resources and power control parameters (e.g., sri-PUSCH-MappingToAddModList_1) for that codepoint value. Similarly, the UE can determine the appropriate SRS resources and/or power control parameters to use for the SDM PUSCH transmissions to the second TRP based on the codepoint value of the second SRI field and the associated mappings to SRS resources and power control parameters (e.g., sri-PUSCH-MappingToAddModList_2) for that codepoint value. The UE may utilize a first TPMI field (or other precoder indicator) to determine the precoding for the SDM PUSCH transmissions to the first TRP and a second TPMI field (or other precoder indicator) to determine the precoding for the SDM PUSCH transmissions to the second TRP. The codepoint value 11 may be associated with an ordering of the TRPs being the second TRP followed by the first TRP, or vice versa. In some instances, the ordering of the TRPs for codepoint value 11 is the opposite of the ordering for the codepoint value 10.

The example groupings of transmission schemes (sTRP or mTRP), one or more SRS resource set(s), one or more SRIs (e.g., the joint SRI, the first SRI field, and/or the second SRI field), and/or one or more precoders (e.g., a TPMI field(s)) provided in Table 1 is exemplary and non-limiting. It is understood that other combinations may be utilized and that different rank combinations, including without limitation 1+1, 1+2, 2+1, and 2+2, may be utilized for SDM mTRP communications, where different sets of layers have different transmission parameters (e.g., beam directions, power control parameters, and/or precoders).

Additionally or alternatively, the UE may support FDM and TDM schemes for uplink PUSCH transmissions. The TDM scheme and/or the FDM scheme may be associated with multi-TRP transmissions. The sTRP transmission scheme may correspond to transmission of uplink PUSCH communications directed to a single TRP. During the TDM, FDM, or SDM schemes, the UE may transmit one or more portions or one or more repetitions of the PUSCH communications to one or more TRPs. A configuration for indicating to the UE a switching arrangement that supports switching between TDM, FDM, and/or SDM schemes using the joint SRI may increase the reliability and throughput of the wireless network (e.g., the network 100 or 200).

The indicated SRS resources may include a first quantity of SRS resources for use by the UE (e.g., a maximum of four SRS resources, or other suitable quantity of SRS resources). Each SRS resource in the SRS resource set may be associated with one antenna port. The UE may determine a number of antenna ports to use for transmitting the uplink PUSCH communications based on the number of antenna ports that are associated with the indicated SRS resources. For non-codebook-based PUSCH communications, the number of antenna ports may correspond to a number of spatial layers (e.g., number of beam directions) of the uplink PUSCH communications and/or a number of TRPs associated with the uplink PUSCH communications. When the UE is configured for mTRP communications, including TDM, FDM, and/or SDM, the UE may transmit multiple uplink communications using the indicated SRS resources.

The UE may receive DCI that schedules multiple uplink PUSCH communications. The UE may support spatial division multiplexing (SDM) for uplink communications in which a first subset of PUSCH communications may be associated with a different set of transmission parameters from a second subset of PUSCH communications. In such cases, the DCI may include a dynamic switching field that indicates whether the UE is to use transmission parameters (e.g., power control settings, beam settings, time/frequency resources, transmission sequences, precoders, etc.) associated with the first SRI field, the second SRI field, and/or the joint SRI for transmitting the uplink PUSCH communications. When the dynamic switching field of the DCI indicates to use parameters associated with both the first SRI field and the second SRI field, first PUSCH communications may be associated with the first SRI field and directed toward a first transmission/reception point (TRP) and second PUSCH communications may be associated with the second SRI field and directed toward a second TRP. The first PUSCH communications may be transmitted at a power level indicated by (e.g., mapped to) the power control settings associated with the first SRI field, while the second PUSCH communications may be transmitted at a power level indicated by (e.g., mapped to) the power control settings associated with the second SRI field. The first PUSCH communications may be associated with the first SRI field and transmitted via a first beam (e.g., a first directional beam), while the second PUSCH communications may be associated with the second SRI field and transmitted via a second beam (e.g., a second directional beam). In some instances, the UE may determine which set of beams is associated with which set of transmission parameters based on one or more SRI fields in the DCI and a value of the dynamic switching field in the DCI (e.g., see Table 1 above). Additionally or alternatively, the UE may transmit one or more layers (e.g., data layers) on each of the beams (e.g., a rank associated with each of the beams). The data layers may be distinguished from one another based on precoding of the PUSCH communications. For example, a transmit precoding matrix indicator (TPMI) or other precoding indicator may indicate the precoding to use for each of the layers. In this regard, the UE may receive the TPMI in DCI.

When the UE supports a spatial division multiplexing (SDM) scheme for uplink PUSCH communications, different spatial layers of an uplink PUSCH communication may be associated with different SRS resource sets and directed toward different TRPs. The UE may receive control signaling and/or DCI to indicate a switching arrangement for the UE to switch between PUSCH communications schemes and corresponding transmission parameters (e.g., power control settings) for uplink communications according to any of an SDM scheme, a TDM scheme, an FDM scheme, and/or a single TRP (sTRP) scheme. The UE may receive control signaling from the BS to indicate a configuration of the multiple communications schemes. The control signaling may configure two or more SRIs (e.g., the first SRI field, the second SRI field, and/or the joint SRI) for the UE. In some aspects, the control signaling and/or DCI may configure a joint SRI that includes a concatenation of the first SRI field and the second SRI field. The UE may receive DCI from the BS to schedule one or more uplink PUSCH communications (e.g., uplink data). In some aspects, the uplink data may include transport blocks, user data, and/or control messages. One or more SRI fields in the DCI may indicate one or more SRS resources from the SRS resource sets that are associated with the uplink PUSCH communications. The indicated SRS resources may correspond to one or more sets of transmission parameters that the UE may use to transmit the uplink PUSCH communications. The UE may transmit the uplink PUSCH communications using the indicated communication scheme(s). The UE may transmit one or more portions and/or repetitions of the uplink PUSCH communications using different sets of transmission parameters based on the switching arrangement.

In some aspects, the control signaling may be radio resource control (RRC) signaling and/or a medium access control-control element (MAC-CE) that indicates one or more of the communications schemes for the UE to use for the uplink communications. For example, the UE may receive a radio resource control (RRC) message from the B S that includes one or more mappings of the transmission parameters (e.g., the power control parameters and/or precoding parameters) to SRI codepoint values. The power control parameters may be stored in one or more tables in the UE. The UE may subsequently receive the DCI that indicates which of the power control parameters stored in the table(s) should be used for the PUSCH communications. For example, the UE may determine the SRS resources and the transmission parameters (e.g., the power control parameters and/or precoding parameters) based on the joint SRI, the first SRI field, and/or the second SRI field. The UE may determine the power control parameters to use for the PUSCH communications based on a mapping of power control parameters to joint SRI codepoints (e.g., a codepoint value of the joint SRI). The UE may receive the DCI that indicates codepoint value of the joint SRI. The UE may receive the dynamic switching field in the same DCI or different DCI that indicates to the UE which SRS resource set(s) to use for transmitting respective portions and/or repetitions of an uplink PUSCH communication using the indicated communications scheme(s). In some aspects, the control signaling/ DCI may indicate a configuration of the SRS resource sets and the multiple communications schemes. The DCI may indicate a single communications scheme and corresponding switching arrangement for the UE. For example, the UE may support a set of switching arrangements and a value of a dynamic switching field in the DCI may indicate a single communications scheme (e.g., SDM). The described techniques provide for a UE to switch between multiple communications schemes and/or multiple power control settings for uplink PUSCH communications.

Each SRS resource or SRS resource group in the SRS resource set may be associated with a set of transmission parameters, including power control parameters, a spatial domain (e.g., a beam direction), a quantity of antenna ports, or other transmission parameters. The UE may receive a scheduling DCI from the BS to schedule each uplink PUSCH communication. In this regard, the UE may receive the scheduling DCI from the BS via a physical downlink control channel (PDCCH). The BS may transmit an SRI codepoint value in the DCI that may indicate one or more SRS resources from the SRS resource set and the power control parameters that are associated with a respective uplink PUSCH communication.

At action 1120, the method 1100 may include a UE (e.g., the UE 115 or the UE 900) transmitting one or more PUSCH communications to a transmission/reception point (TRP) based on SRS resources and transmission parameters (e.g., power control settings and/or precoding settings) associated with the joint SRI.

In some aspects, the UE may transmit one or more PUSCH communications to a single TRP based on the joint SRI. The joint SRI may be a concatenation of the first SRI field and the second SRI field. In some aspects, the joint SRI may be a concatenation of 4 bits of the first SRI field and 4 bits of the second SRI field for a total of 8 bits in the joint SRI field. The 8 bits of the joint SRI field may map to one of up to 256 different codepoint values. The 256 codepoint values may be mapped to different power control parameters. The mapping of power control parameters to joint SRI codepoints may be stored in a power control parameter list or mapping (e.g., a third or fourth power control parameter list, such as sri-PUSCH-MappingToAddModList_1, sri-PUSCH-MappingToAddModList_2, sri-PUSCH-MappingToAddModList_3, sri-PUSCH-MappingToAddModList_4). In some aspects, 256 codepoint values of the joint SRI may map to 256 different power control parameters. The joint SRI codepoint values may also map to SRS resources and/or time/frequency resources for transmitting the PUSCH communications to the single TRP. The single TRP may be selected from multiple TRPs.

In some aspects, the UE may select the mapping of the power control parameters to the joint SRI codepoints from a plurality of mappings. The plurality of mappings may include a mapping of power control parameters to codepoints associated with the first SRI field, a mapping of power control parameters to codepoints associated with the second SRI field and/or the mapping of the power control parameters to the joint SRI codepoints. In some aspects, the mapping of the power control parameters to the joint SRI codepoints may include mapping the power control parameters to the codepoints associated with the first SRI field. For example, the first 16 entries of the third power control parameter list such as sri-PUSCH-MappingToAddModList/ or sri-PUSCH-MappingToAddModList_2, may be the same as the first 16 entries of the first power control parameter list. In some aspects, the third power control parameter list may be associated with codepoint 00 of the dynamic switching field directed toward the first TRP.

In some aspects, the mapping of the power control parameters to the joint SRI codepoints may include mapping the power control parameters to the codepoints associated with the second SRI field. For example, the first 16 entries of the fourth power control parameter list such as sri-PUSCH-MappingToAddModList_3 or sri-PUSCH-MappingToAddModList_4 may be the same as the first 16 entries of the second power control parameter list. In some aspects, the fourth power control parameter list may be associated with codepoint 01 of the dynamic switching field directed toward the second TRP.

In some aspects, the UE may transmit PUSCH communications to multiple TRPs, including in an SDM mode where the UE simultaneously transmits to the multiple TRPs. In this regard, the UE may use a mapping of the values in the first SRI field and the second SRI field to SRS resources that may be used for the PUSCH communications to multiple TRPs. The first SRI field may indicate time and/or frequency resources for PUSCH communications for a first TRP (e.g., a first beam direction). The second SRI field may indicate time and/or frequency resources for PUSCH communications for a second TRP (e.g., a second beam direction). Each of the PUSCH communications directed towards the first and second TRPs may include one or data layers. The number of data layers may be based on a rank indicated in the DCI. For example, a rank of 1, 1 for the first and second TRPs respectively may indicate that each of the PUSCH communications directed to the first and second TRPs may each include one data layer. A rank of 1, 2 for the first and second TRPs, respectively, may indicate that the PUSCH communications directed to the first TRP includes one data layer and the PUSCH communications directed to the second TRP includes two data layers. A rank of 2, 1 for the first and second TRPs respectively may indicate that the PUSCH communications directed to the first TRP includes two data layers and the PUSCH communications directed to the second TRP includes one data layer. A rank of 2, 2 for the first and second TRPs respectively may indicate that the PUSCH communications directed to the first TRP may include two data layers and the PUSCH communications directed to the second TRP includes two data layers. In some instances, each of the data layers may be differentiated by precoding of the PUSCH communications.

In some aspects, the method 1100 further includes the UE receiving, from the base station (BS), a first SRI and a second SRI; transmitting, to a first TRP, one or more first PUSCH communications based on SRS resources and transmission parameters associated with the first SRI; and transmitting, to a second TRP different than the first TRP, one or more second PUSCH communications based on SRS resources and transmission parameters associated with the second SRI, wherein the one or more second PUSCH communications are spatial division multiplexed with the one or more first PUSCH communications.

Figure 12:
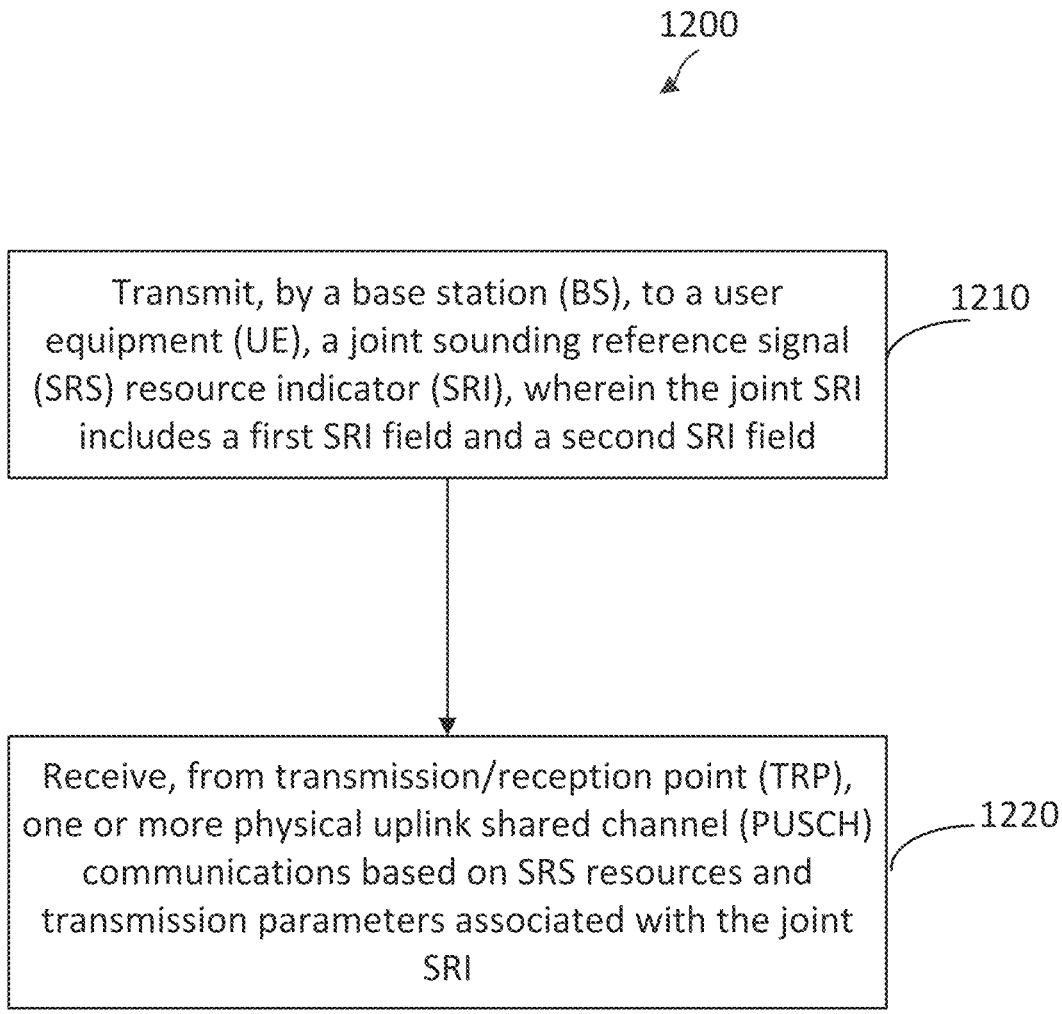
FIG. 12 is a flow diagram of a communication method according to some aspects of the present disclosure.

FIG. 12 is a flow diagram of a communication method 1200 according to some aspects of the present disclosure. Aspects of the method 1200 can be executed by a computing device (e.g., a processor, processing circuit, and/or other suitable component) of a wireless communication device or other suitable means for performing the actions. For example, a wireless communication device, such as the BS 105 or the BS 1000, may utilize one or more components, such as the processor 1002, the memory 1004, the PUSCH power control module 1008, the transceiver 1010, the modem 1012, and the one or more antennas 1016, to execute aspects of method 1200. The method 1200 may employ similar mechanisms as in the networks 100 and 200 and the aspects and actions described with respect to FIGS. 2-6. As illustrated, the method 1200 includes a number of enumerated actions, but the method 1200 may include additional actions before, after, and in between the enumerated actions. In some aspects, one or more of the enumerated actions may be omitted or performed in a different order.

At action 1210, the method 1200 includes a BS (e.g., the BS 105 or the BS 1000) transmitting a joint sounding reference signal (SRS) resource indicator (SRI) to a UE (e.g., the UE 115 or the UE 900). The BS may transmit the joint SRI to the UE in downlink control information (DCI), MAC-CE, RRC message, and/or another suitable communication or information element. The joint SRI may comprise a plurality of bits (e.g., 4 bits, 6 bits, 8 bits, 12 bits, 16 bits, 24 bits, 32 bits, or other suitable number of bits). In some instances, the joint SRI can include a first SRI field and a second SRI field, each of the first SRI field and the second SRI field having a plurality of bits. For example, the joint SRI can include a total number of bits (e.g., 4 bits, 6 bits, 8 bits, 12 bits, 16 bits, 24 bits, 32 bits, or other suitable number of bits) equal to the number of bits in the first SRI field (e.g., 2 bits, 3 bits, 4 bits, 6 bits, 8 bits, 12 bits, 16 bits, or other suitable number of bits) plus the number of bits in the second SRI field (e.g., 2 bits, 3 bits, 4 bits, 6 bits, 8 bits, 12 bits, 16 bits, or other suitable number of bits). The first and second SRI fields may have an equal number of bits or a different number of bits. The joint SRI may comprise a concatenation of two or more SRI fields (e.g., a concatenation of the first SRI field and the second SRI field). In some instances, the first SRI field and/or the second SRI field may itself be an SRI.

As discussed in greater detail below, a codepoint value of the joint SRI, a codepoint value of the first SRI field, and/or a codepoint value of the second SRI field may be utilized by the BS to indicate to the UE one or more SRS resources and/or transmission parameters, including without limitation power control parameters, such as a P0 value, an Alpha value for open-loop power control through sri-P0-PUSCH-AlphaSetID, a pathloss value through sri-PUSCH-PathlossReferenceRS-ID), a closed-loop power control index value through sri-PUSCH-ClosedLoopIndex, and/or other power control parameters, and/or precoding parameters (e.g., TPMI).

In some aspects, the BS may configure the UE with multiple SRS resource sets (e.g., one SRS resource set for codebook-based communications and one or more SRS resource sets for non-codebook-based communications). Each SRS resource set may include time domain resources, spatial domain resources, and/or frequency domain resources including symbols, slots, frames, sub-frames, transmission time intervals, beams (e.g., directional beams), resource elements, resources blocks, subchannels, frequency bands, subbands, coresets, bandwidth parts, or a combination thereof. The BS may transmit an indication of the SRS resource sets to the UE via radio resource control (RRC) signaling or other suitable signaling.

In some aspects, the BS may receive one or more PUSCH communications via one or more transmission/reception points (TRPs) using codebook-based PUSCH communications and/or non-codebook-based PUSCH communications. The SRS resources and/or transmission parameters (e.g., power control parameters, precoding parameters, etc.) indicated by the joint SRI, first SRI field, and/or second SRI field transmitted at action 1210 may be based on the type of uplink communications (e.g., codebook-based, or non-codebook-based).

For codebook-based PUSCH communications, the BS may transmit control signaling (e.g., RRC signaling) to the UE that indicates to use one SRS resource set for codebook-based PUSCH communications (e.g., an SRS resource set with "usage" set to "codebook"). The BS may configure the UE multiple SRS resources sets (e.g., 2, 3, etc.) for codebook-based PUSCH communications. For non-codebook-based PUSCH communications, the BS may transmit control signaling (e.g., RRC signaling) that indicates to use an SRS resource set for non-codebook-based PUSCH (e.g., an SRS resource set with "usage" set to "non-codebook"). The BS may configure the UE with multiple SRS resources sets (e.g., 2, 3, etc.) for non-code-book-based PUSCH communications. For both codebook-based and non-codebook-based PUSCH communications, the indicated SRS resource set may include a first quantity of SRS resources for use by the UE (e.g., a maximum of four SRS resources, or other suitable quantity of resources). Each SRS resource or SRS resource group in an SRS resource set may be associated with a number of antenna ports (e.g., nrofSRS-Ports, 1 port, 2 ports, 3 ports, etc.). In some aspects, the joint SRI, the first SRI field, and/or the second SRI field in the DCI, the MAC-CE, and/or the RRC message may indicate one or more SRS resources from the SRS resource set.

In some instances, a codepoint value of the joint SRI, the first SRI field, and/or the second SRI field may be utilized by the UE to identify the SRS resources and/or transmission parameters (e.g., power control parameters, precoding parameters, etc.) for PUSCH communications. In some instances, the UE may utilize a mapping of codepoint values to SRS resources to identify the corresponding SRS resources. Similarly, the UE may utilize a mapping of codepoint values to transmission parameters to identify the corresponding transmission parameters, including power control parameters and/or precoding parameters.

In some instances, the UE may determine whether to use a codepoint value of the joint SRI, a codepoint value of the first SRI field, and/or a codepoint value of the second SRI field to identify the one or more SRS resources and/or transmission parameters based on an indication from the BS. In some instances, the indication may be a value of a dynamic switching field of the DCI, the MAC-CE, and/or the RRC signaling. For example, the value of the dynamic switching field may indicate to the UE which mapping (e.g., a mapping associated with the joint SRI, a mapping associated with the first SRI field, and/or a mapping associated with the second SRI field) of a plurality of available mappings of codepoint values to SRS resources to use to identify the SRS resources from the SRS resource set. Likewise, the value of the dynamic switching field may indicate to the UE which mapping (e.g., a mapping associated with the joint SRI, a mapping associated with the first SRI field, and/or a mapping associated with the second SRI field) of a plurality of available mappings of codepoint values to transmission parameters to use to identify the transmission parameters. In some instances, the same codepoint value (e.g., based on the joint SRI, first SRI field, or second SRI field) is used to identify both the SRS resources and the transmission parameters for the PUSCH communications.

The BS may transmit the plurality of mappings of codepoint values to SRS resources and/or the plurality of mappings of codepoint values to transmission parameters to the UE via radio resource control (RRC) signaling or other suitable signaling. In some instances, the mappings of codepoint values to transmission parameters includes a plurality of mappings of codepoint values to power control parameters (e.g., sri-PUSCH-MappingToAddModList_1, sri-PUSCH-MappingToAddModList_2, sri-PUSCH-MappingToAddModList_3, sri-PUSCH-MappingToAddModList_4, etc.).

The UE may select the appropriate mapping(s) to use based on a codepoint value of the dynamic switching field indicated in the DCI, MAC-CE, and/or RRC signaling or other indication from the BS. For example, in the context of SDM the dynamic switching field may comprise 2 bits and have four associated codepoint values (i.e., 00, 01, 10, and 11). Each codepoint value may be associated with a transmission scheme (sTRP or mTRP), one or more SRS resource set(s), one or more SRIs (e.g., the joint SRI, the first SRI field, and/or the second SRI field), and/or one or more precoders (e.g., a TPMI field(s)).

In some aspects, to support switching between sTRP and mTRP PUSCH communications in the presence of SDM, the DCI, MAC-CE, and/or RRC signaling may include a dynamic switching field that is configured to indicate an arrangement for switching between the different transmission schemes for the uplink PUSCH communications. A codepoint value of the dynamic switching field (e.g., a two-bit field) as shown in Table 1 may indicate whether the UE is configured to transmit the uplink PUSCH communications based on the first SRI field, the second SRI field, and/or the joint SRI. Based on the codepoint value and/or indicated SRI, the UE can select and/or utilize the associated mappings to SRS resources and/or transmission parameters. In this regard, the value of the codepoint of the dynamic switching field may indicate to the UE the transmission scheme (e.g., sTRP or mTRP), SRS resources set(s) for the PUSCH communications, and/or transmission parameters (e.g., power control parameters and/or precoding parameters). Likewise, the value of the codepoint of the dynamic switching field may indicate to the UE which mapping(s) of SRS resources and/or transmission parameters to use to determine the SRS resources and transmission parameters for the PUSCH communications.

As shown in the example of Table 1 above, when the codepoint value of the dynamic switching field is 00, the UE may be indicated to transmit in an sTRP mode using a first SRS resource set (e.g., a first codebook SRS resource set or a first non-codebook SRS resource set) associated with a first TRP based on the joint SRI and a TPMI field (or other precoder indicator). Accordingly, in some instances the UE can determine the appropriate SRS resources and/or power control parameters to use for the sTRP PUSCH transmissions to the first TRP based on the codepoint value of the joint SRI and the associated mappings to SRS resources and power control parameters (e.g., sri-PUSCH-MappingToAddModList_3) for that codepoint value. For example, the joint SRI may include 8 bits. The 8 bits of the joint SRI may indicate one of up to 256 different codepoint values. The 256 different codepoint values may be mapped to SRS resources (e.g., an SRS resource mapping as shown in FIGS. 4A and 4B) and/or power control parameters (e.g., a power control parameter mapping as shown in FIGS. 4A and 4B) for the sTRP PUSCH transmissions to the first TRP.

When the codepoint value of the dynamic switching field is 01, the UE may be indicated to transmit in an sTRP mode using a second SRS resource set (e.g., a second codebook SRS resource set or a second non-codebook SRS resource set) associated with a second TRP (different than the first TRP) based on the joint SRI and a TPMI field (or other precoder indicator). Accordingly, in some instances the UE can determine the appropriate SRS resources and/or power control parameters to use for the sTRP PUSCH transmissions to the second TRP based on the codepoint value of the joint SRI and the associated mappings to SRS resources and power control parameters (e.g., sri-PUSCH-MappingToAddModList_3 or sri-PUSCH-MappingToAddModList_4) for that codepoint value. For example, the joint SRI may include 8 bits. The 8 bits of the joint SRI may indicate one of up to 256 different codepoint values. The 256 different codepoint values may be mapped to SRS resources (e.g., an SRS resource mapping as shown in FIGS. 4A and 4B) and/or power control parameters (e.g., a power control parameter mapping as shown in FIGS. 4A and 4B) for the sTRP PUSCH transmissions to the second TRP.

When the codepoint value of the dynamic switching field is 10, the UE may be indicated to transmit in an mTRP SDM mode using first and second SRS resource sets (e.g., first and second codebook SRS resource sets or first and second non-codebook SRS resource sets) based on the first and second SRI fields and first and second TPMI fields (or other precoder indicators). Accordingly, in some instances the UE can determine the appropriate SRS resources and/or power control parameters to use for the SDM PUSCH transmissions to the first TRP based on the codepoint value of the first SRI field and the associated mappings to SRS resources and power control parameters (e.g., sri-PUSCH-MappingToAddModList_1) for that codepoint value. Similarly, the UE can determine the appropriate SRS resources and/or power control parameters to use for the SDM PUSCH transmissions to the second TRP based on the codepoint value of the second SRI field and the associated mappings to SRS resources and power control parameters (e.g., sri-PUSCH-MappingToAddModList_2) for that codepoint value. For example, the first SRI field and the second SRI field may each include 4 bits. The 4 bits of the first SRI field and the 4 bits of the second SRI field may each indicate one of up to 16 different codepoint values. The 16 different codepoint values may be mapped to SRS resources (e.g., an SRS resource mapping as shown in FIG. 3) and/or power control parameters (e.g., a power control parameter mapping as shown in FIG. 3). For example, the first SRI field may be mapped to 16 sets of power control parameters in a first power control parameter mapping (sri-PUSCH-MappingToAddModList_1) while the second SRI field may be mapped to 16 sets of power control parameters in a second power control parameter mapping (sri-PUSCH-MappingToAddModList_2). Each of the two sets of 16 power control parameters in the power control parameter mappings may include the same or may include different power control parameters. The UE may utilize a first TPMI field (or other precoder indicator) to determine the precoding for the SDM PUSCH transmissions to the first TRP and a second TPMI field (or other precoder indicator) to determine the precoding for the SDM PUSCH transmissions to the second TRP. The codepoint value 10 may be associated with an ordering of the TRPs being the first TRP followed by the second TRP, or vice versa.

When the codepoint value of the dynamic switching field is 11, the UE may be indicated to transmit in an mTRP SDM mode using first and second SRS resource sets (e.g., first and second codebook SRS resource sets or first and second non-codebook SRS resource sets) based on the first and second SRI fields and first and second TPMI fields (or other precoder indicators). Accordingly, in some instances the UE can determine the appropriate SRS resources and/or power control parameters to use for the SDM PUSCH transmissions to the first TRP based on the codepoint value of the first SRI field and the associated mappings to SRS resources and power control parameters (e.g., sri-PUSCH-MappingToAddModList_1) for that codepoint value. Similarly, the UE can determine the appropriate SRS resources and/or power control parameters to use for the SDM PUSCH transmissions to the second TRP based on the codepoint value of the second SRI field and the associated mappings to SRS resources and power control parameters (e.g., sri-PUSCH-MappingToAddModList_2) for that codepoint value. The UE may utilize a first TPMI field (or other precoder indicator) to determine the precoding for the SDM PUSCH transmissions to the first TRP and a second TPMI field (or other precoder indicator) to determine the precoding for the SDM PUSCH transmissions to the second TRP. The codepoint value 11 may be associated with an ordering of the TRPs being the second TRP followed by the first TRP, or vice versa. In some instances, the ordering of the TRPs for codepoint value 11 is the opposite of the ordering for the codepoint value 10.

The example groupings of transmission schemes (sTRP or mTRP), one or more SRS resource set(s), one or more SRIs (e.g., the joint SRI, the first SRI field, and/or the second SRI field), and/or one or more precoders (e.g., a TPMI field(s)) provided in Table 1 is exemplary and non-limiting. It is understood that other combinations may be utilized and that different rank combinations, including without limitation 1+1, 1+2, 2+1, and 2+2, may be utilized for SDM mTRP communications, where different sets of layers have different transmission parameters (e.g., beam directions, power control parameters, and/or precoders).

Additionally or alternatively, the UE may support FDM and TDM schemes for uplink PUSCH transmissions. The TDM scheme and/or the FDM scheme may be associated with multi-TRP transmissions. The sTRP transmission scheme may correspond to transmission of uplink PUSCH communications directed to a single TRP. During the TDM, FDM, or SDM schemes, the UE may transmit one or more portions or one or more repetitions of the PUSCH communications to one or more TRPs. A configuration for indicating to the UE a switching arrangement that supports switching between TDM, FDM, and/or SDM schemes using the joint SRI may increase the reliability and throughput of the wireless network (e.g., the network 100 or 200).

The indicated SRS resources may include a first quantity of SRS resources for use by the UE (e.g., a maximum of four SRS resources, or other suitable quantity of SRS resources). Each SRS resource in the SRS resource set may be associated with one antenna port. The UE may determine a number of antenna ports to use for transmitting the uplink PUSCH communications based on the number of antenna ports that are associated with the indicated SRS resources. For non-codebook based PUSCH communications, the number of antenna ports may correspond to a number of spatial layers (e.g., number of beam directions) of the uplink PUSCH communications and/or a number of TRPs associated with the uplink PUSCH communications. When the UE is configured for mTRP communications, including TDM, FDM, and/or SDM, the UE may transmit multiple uplink communications using the indicated SRS resources.

The UE may receive DCI that schedules multiple uplink PUSCH communications. The UE may support spatial division multiplexing (SDM) for uplink communications in which a first subset of PUSCH communications may be associated with a different set of transmission parameters from a second subset of PUSCH communications. In such cases, the DCI may include a dynamic switching field that indicates whether the UE is to use transmission parameters (e.g., power control settings, beam settings, time/frequency resources, transmission sequences, precoders, etc.) associated with the first SRI field, the second SRI field, and/or the joint SRI for transmitting the uplink PUSCH communications. When the dynamic switching field of the DCI indicates to use parameters associated with both the first SRI field and the second SRI field, first PUSCH communications may be associated with the first SRI field and directed toward a first transmission/reception point (TRP) and second PUSCH communications may be associated with the second SRI field and directed toward a second TRP. The first PUSCH communications may be transmitted at a power level indicated by (e.g., mapped to) the power control settings associated with the first SRI field, while the second PUSCH communications may be transmitted at a power level indicated by (e.g., mapped to) the power control settings associated with the second SRI field. The first PUSCH communications may be associated with the first SRI field and transmitted via a first beam (e.g., a first directional beam), while the second PUSCH communications may be associated with the second SRI field and transmitted via a second beam (e.g., a second directional beam). In some instances, the UE may determine which set of beams is associated with which set of transmission parameters based on one or more SRI fields in the DCI and a value of the dynamic switching field in the DCI (e.g., see Table 1 above). Additionally or alternatively, the UE may transmit one or more layers (e.g., data layers) on each of the beams (e.g., a rank associated with each of the beams). The data layers may be distinguished from one another based on precoding of the PUSCH communications. For example, a transmit precoding matrix indicator (TPMI) or other precoding indicator may indicate the precoding to use for each of the layers. In this regard, the BS may transmit the TPMI in DCI.

When the UE supports a spatial division multiplexing (SDM) scheme for uplink PUSCH communications, different spatial layers of an uplink PUSCH communication may be associated with different SRS resource sets and directed toward different TRPs. The UE may receive control signaling and/or DCI to indicate a switching arrangement for the UE to switch between PUSCH communications schemes and corresponding transmission parameters (e.g., power control settings) for uplink communications according to any of an SDM scheme, a TDM scheme, an FDM scheme, and/or a single TRP (sTRP) scheme. The BS may transmit control signaling to the UE to indicate a configuration of the multiple communications schemes. The control signaling may configure two or more SRIs (e.g., the first SRI field, the second SRI field, and/or the joint SRI) for the UE. In some aspects, the control signaling and/or DCI may configure a joint SRI that includes a concatenation of the first SRI field and the second SRI field. The BS may transmit DCI to the UE to schedule one or more uplink PUSCH communications (e.g., uplink data). In some aspects, the uplink data may include transport blocks, user data, and/or control messages. One or more SRI fields in the DCI may indicate one or more SRS resources from the SRS resource sets that are associated with the uplink PUSCH communications. The indicated SRS resources may correspond to one or more sets of transmission parameters that the UE may use to transmit the uplink PUSCH communications. The BS may receive the uplink PUSCH communications using the indicated communication scheme(s). The BS may receive one or more portions and/or repetitions of the uplink PUSCH communications using different sets of transmission parameters based on the switching arrangement.

In some aspects, the control signaling may be radio resource control (RRC) signaling and/or a medium access control-control element (MAC-CE) that indicates one or more of the communications schemes for the UE to use for the uplink communications. For example, the UE may receive a radio resource control (RRC) message from the BS that includes one or more mappings of the transmission parameters (e.g., the power control parameters and/or precoding parameters) to SRI codepoint values. The power control parameters may be stored in one or more tables in the UE. The UE may subsequently receive the DCI that indicates which of the power control parameters stored in the table(s) should be used for the PUSCH communications. For example, the UE may determine the SRS resources and the transmission parameters (e.g., the power control parameters and/or precoding parameters) based on the joint SRI, the first SRI field, and/or the second SRI field. The UE may determine the power control parameters to use for the PUSCH communications based on a mapping of power control parameters to joint SRI codepoints (e.g., a codepoint value of the joint SRI). The BS may transmit the DCI that indicates codepoint value of the joint SRI. The BS may transmit the dynamic switching field in the same DCI or different DCI that indicates to the UE which SRS resource set(s) to use for transmitting respective portions and/or repetitions of an uplink PUSCH communication using the indicated communications scheme(s). In some aspects, the control signaling/DCI may indicate a configuration of the SRS resource sets and the multiple communications schemes. The DCI may indicate a single communications scheme and corresponding switching arrangement for the UE. For example, the UE may support a set of switching arrangements and a value of a dynamic switching field in the DCI may indicate a single communications scheme (e.g., SDM). The described techniques provide for a UE to switch between multiple communications schemes and/or multiple power control settings for uplink PUSCH communications.

Each SRS resource or SRS resource group in the SRS resource set may be associated with a set of transmission parameters, including power control parameters, a spatial domain (e.g., a beam direction), a quantity of antenna ports, or other transmission parameters. BS may transmit a scheduling DCI to the UE to schedule each uplink PUSCH communication. In this regard, the BS may transmit the scheduling DCI to the UE via a physical downlink control channel (PDCCH). The BS may transmit an SRI codepoint value in the DCI that may indicate one or more SRS resources from the SRS resource set and the power control parameters that are associated with a respective uplink PUSCH communication.

At action 1220, the method 1200 may include a BS (e.g., the BS 105 or the BS 1000) receiving one or more PUSCH communications via a transmission/reception point (TRP) based on SRS resources and transmission parameters (e.g., power control settings and/or precoding settings) associated with the joint SRI.

In some aspects, the BS may receive one or more PUSCH communications via a single TRP based on the joint SRI. The joint SRI may be a concatenation of the first SRI field and the second SRI field. In some aspects, the joint SRI may be a concatenation of 4 bits of the first SRI field and 4 bits of the second SRI field for a total of 8 bits in the joint SRI field. The 8 bits of the joint SRI field may map to one of up to 256 different codepoint values. The 256 codepoint values may be mapped to different power control parameters. The mapping of power control parameters to joint SRI codepoints may be stored in a power control parameter list or mapping (e.g., a third or fourth power control parameter list, such as sri-PUSCH-MappingToAddModList_1, sri- PUSCH-MappingToAddModList_2, sri-PUSCH-MappingToAddModList_3, sri-PUSCH-MappingToAddModList_4). In some aspects, 256 codepoint values of the joint SRI may map to 256 different power control parameters. The joint SRI codepoint values may also map to SRS resources and/or time/frequency resources for transmitting the PUSCH communications to the single TRP. The single TRP may be selected from multiple TRPs.

In some aspects, the UE may select the mapping of the power control parameters to the joint SRI codepoints from a plurality of mappings. The plurality of mappings may include a mapping of power control parameters to codepoints associated with the first SRI field, a mapping of power control parameters to codepoints associated with the second SRI field and/or the mapping of the power control parameters to the joint SRI codepoints. In some aspects, the mapping of the power control parameters to the joint SRI codepoints may include mapping the power control parameters to the codepoints associated with the first SRI field. For example, the first 16 entries of the third power control parameter list such as sri-PUSCH-MappingToAddModList_1 or sri-PUSCH-MappingToAddModList_2, may be the same as the first 16 entries of the first power control parameter list. In some aspects, the third power control parameter list may be associated with codepoint 00 of the dynamic switching field directed toward the first TRP.

In some aspects, the mapping of the power control parameters to the joint SRI codepoints may include mapping the power control parameters to the codepoints associated with the second SRI field. For example, the first 16 entries of the fourth power control parameter list such as sri-PUSCH-MappingToAddModList_3 or sri-PUSCH-MappingToAddModList_4 may be the same as the first 16 entries of the second power control parameter list. In some aspects, the fourth power control parameter list may be associated with codepoint 01 of the dynamic switching field directed toward the second TRP.

In some aspects, the BS may receive PUSCH communications via multiple TRPs, including in an SDM mode where the BS simultaneously receives communications via the multiple TRPs. In this regard, the UE may use a mapping of the values in the first SRI field and the second SRI field to SRS resources that may be used for the PUSCH communications to multiple TRPs. The first SRI field may indicate time and/or frequency resources for PUSCH communications for a first TRP (e.g., a first beam direction). The second SRI field may indicate time and/or frequency resources for PUSCH communications for a second TRP (e.g., a second beam direction). Each of the PUSCH communications directed towards the first and second TRPs may include one or data layers. The number of data layers may be based on a rank indicated in the DCI. For example, a rank of 1, 1 for the first and second TRPs respectively may indicate that each of the PUSCH communications directed to the first and second TRPs may each include one data layer. A rank of 1, 2 for the first and second TRPs, respectively, may indicate that the PUSCH communications directed to the first TRP includes one data layer and the PUSCH communications directed to the second TRP includes two data layers. A rank of 2, 1 for the first and second TRPs respectively may indicate that the PUSCH communications directed to the first TRP includes two data layers and the PUSCH communications directed to the second TRP includes one data layer. A rank of 2, 2 for the first and second TRPs respectively may indicate that the PUSCH communications directed to the first TRP may include two data layers and the PUSCH communications directed to the second TRP includes two data layers. In some instances, each of the data layers may be differentiated by precoding of the PUSCH communications.

In some aspects, the method 1200 includes the BS transmitting, to the UE, a dynamic switching field, wherein the dynamic switching field indicates at least one mapping of a plurality of mappings, wherein the plurality of mappings includes: a mapping of power control parameters to codepoints associated with the first SRI field; a mapping of power control parameters to codepoints associated with the second SRI field; and a mapping of the power control parameters to the joint SRI codepoints.

Further aspects of the present disclosure include the following:

Aspect 1 includes a method of wireless communication performed by a user equipment (UE), the method comprising receiving, from a base station (BS), a joint sounding reference signal (SRS) resource indicator (SRI), wherein the joint SRI includes a first SRI field and a second SRI field; and transmitting, to a transmission/reception point (TRP), one or more physical uplink shared channel (PUSCH) communications based on SRS resources and transmission parameters using the joint SRI.

Aspect 2 includes the method of aspect 1, further comprising determining the SRS resources and the transmission parameters based on the joint SRI.

Aspect 3 includes the method of any of aspects 1-2, wherein the determining the transmission parameters comprises determining one or more power control parameters based on the joint SRI.

Aspect 4 includes the method of any of aspects 1-3, wherein the determining the one or more power control parameters comprises determining, based on a mapping of power control parameters to joint SRI codepoints, the one or more power control parameters based on a codepoint value of the joint SRI.

Aspect 5 includes the method of any of aspects 1-4, wherein the transmitting the one or more PUSCH communications comprises transmitting the one or more PUSCH communications in a sequence of consecutive slots; and each of the one or more PUSCH communications uses a same beam direction and common uplink power control parameters.

Aspect 6 includes the method of any of aspects 1-5, further comprising selecting the mapping of the power control parameters to the joint SRI codepoints from a plurality of mappings, wherein the plurality of mappings include a mapping of power control parameters to codepoints associated with the first SRI field; a mapping of power control parameters to codepoints associated with the second SRI field; and the mapping of the power control parameters to the joint SRI codepoints.

Aspect 7 includes the method of any of aspects 1-6, wherein the mapping of the power control parameters to the joint SRI codepoints includes mapping the power control parameters to the codepoints associated with the first SRI field.

Aspect 8 includes the method of any of aspects 1-7, wherein the plurality of mappings further includes a second mapping of the power control parameters to the joint SRI codepoints.

Aspect 9 includes the method of any of aspects 1-8, wherein the mapping of the power control parameters to the joint SRI codepoints includes mapping the power control parameters to the codepoints associated with the first SRI field; and the second mapping of the power control parameters to the joint SRI codepoints includes mapping the power control parameters to the codepoints associated with the second SRI field.

Aspect 10 includes the method of any of aspects 1-9, further comprising receiving, from the BS, downlink control information (DCI), the DCI including the joint SRI and a dynamic switching field; and wherein the selecting the mapping of the power control parameters to the joint SRI codepoints from the plurality of mappings comprises selecting the mapping of the power control parameters to the joint SRI codepoints based on a value of the dynamic switching field.

Aspect 11 includes the method of any of aspects 1-10, wherein the transmitting the one or more PUSCH communications comprises transmitting, to the TRP, the one or more PUSCH communications sequentially using a same beam direction and common uplink power control parameters.

Aspect 12 includes the method of any of aspects 1-11, further comprising receiving, from the BS, a radio resource control (RRC) message, the RRC message including the transmission parameters.

Aspect 13 includes the method of any of aspects 1-11, further comprising transmitting, to the UE, a dynamic switching field, wherein the dynamic switching field indicates at least one mapping of a plurality of mappings, wherein the plurality of mappings includes: a mapping of power control parameters to codepoints associated with the first SRI field; a mapping of power control parameters to codepoints associated with the second SRI field; and a mapping of the power control parameters to the joint SRI codepoints.

Aspect 14 includes a method of wireless communication performed by a base station (BS), the method comprising transmitting, to a user equipment (UE), a joint sounding reference signal (SRS) resource indicator (SRI), wherein the joint SRI includes a first SRI field and a second SRI field; and receiving, via a transmission/reception point (TRP), one or more physical uplink shared channel (PUSCH) communications based on SRS resources and transmission parameters using the joint SRI.

Aspect 15 includes the method of aspect 14, transmitting, to the UE, a dynamic switching field, wherein the dynamic switching field indicates at least one mapping of a plurality of mappings, wherein the plurality of mappings includes: a mapping of power control parameters to codepoints associated with the first SRI field; a mapping of power control parameters to codepoints associated with the second SRI field; and a mapping of the power control parameters to the joint SRI codepoints.

Aspect 16 includes a non-transitory computer-readable medium storing one or more instructions for wireless communication, the one or more instructions comprising one or more instructions that, when executed by one or more processors of a user equipment (UE), cause the one or more processors to perform any one of aspects 1-12.

Aspect 17 includes a non-transitory computer-readable medium storing one or more instructions for wireless communication, the one or more instructions comprising one or more instructions that, when executed by one or more processors of a base station (BS), cause the one or more processors to perform any one of aspects 13-15.

Aspect 18 includes a user equipment (UE) comprising one or more means to perform any one or more of aspects 1-12.

Aspect 19 includes a base station (BS) comprising one or more means to perform any one or more of aspects 13-15.

Aspect 20 includes a user equipment (UE) comprising a memory, a transceiver and at least one processor coupled to the memory and the transceiver, wherein the UE is configured to perform any one or more of aspects 1-12.

Aspect 21 includes a base station (BS) comprising a memory, a transceiver and at least one processor coupled to the memory and the transceiver, wherein the BS is configured to perform any one or more of aspects 13-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving a joint sounding reference signal (SRS) resource indicator (SRI), wherein the joint SRI includes a first SRI field and a second SRI field; and transmitting, to a transmission/reception point (TRP), one or more physical uplink shared channel (PUSCH) communications based on SRS resources and transmission parameters associated with the joint SRI, wherein the transmission parameters associated with the joint SRI are based, at least in part, on a mapping of power control parameters to joint SRI codepoints, wherein the mapping of power control parameters to joint SRI codepoints is one of plurality of mappings, the plurality of mappings including:
- the mapping of power control parameters to the joint SRI codepoints,
- a mapping of power control parameters to codepoints associated with the first SRI field, and
- a mapping of power control parameters to codepoints associated with the second SRI field.

2. The method of claim 1, further comprising:
determining the SRS resources and the transmission parameters based on the joint SRI.

3. The method of claim 2, wherein the determining the transmission parameters comprises:
determining one or more power control parameters based on the joint SRI.

4. The method of claim 3, wherein the determining the one or more power control parameters comprises:
determining, based on the mapping of power control parameters to the joint SRI codepoints, the one or more power control parameters based on a codepoint value of the joint SRI.

5. The method of claim 4, wherein the determining the SRS resources comprises:
determining, based on a mapping of SRS resources to the joint SRI codepoints, the SRS resources based on the codepoint value of the joint SRI, wherein the SRS resources associated with the joint SRI are based, at least in part, on the mapping of SRS resources to the joint SRI codepoints, wherein the mapping of SRS resources to the joint SRI codepoints is one of plurality of SRS resource mappings, the plurality of SRS resource mappings further including a mapping of SRS resources to codepoints associated with the first SRI field and a mapping of SRS resources to codepoints associated with the second SRI field.

6. The method of claim 4, further comprising:
selecting the mapping of the power control parameters to the joint SRI codepoints from the plurality of mappings.

7. The method of claim 6, wherein the mapping of the power control parameters to the joint SRI codepoints includes mapping the power control parameters to the codepoints associated with the first SRI field.

8. The method of claim 6, wherein the plurality of mappings further includes:
a second mapping of the power control parameters to the joint SRI codepoints.

9. The method of claim 8, wherein:
the mapping of the power control parameters to the joint SRI codepoints includes mapping the power control parameters to the codepoints associated with the first SRI field; and
the second mapping of the power control parameters to the joint SRI codepoints includes mapping the power control parameters to the codepoints associated with the second SRI field.

10. A method of wireless communication performed by a user equipment (UE), the method comprising:

receiving, from a base station (BS), a joint sounding reference signal (SRS) resource indicator (SRI), wherein the joint SRI includes a first SRI field and a second SRI field;
receiving, from the BS, downlink control information (DCI), the DCI including the joint SRI and a dynamic switching field; and
determining SRS resources and transmission parameters associated with the joint SRI based on the joint SRI, wherein:
the determining the transmission parameters comprises determining one or more power control parameters based on the joint SRI; and
the determining the one or more power control parameters comprises determining, based on a mapping of power control parameters to joint SRI codepoints, the one or more power control parameters based on a codepoint value of the joint SRI; and
selecting the mapping of the power control parameters to the joint SRI codepoints from a plurality of mappings, wherein the plurality of mappings include:
a mapping of power control parameters to codepoints associated with the first SRI field;
a mapping of power control parameters to codepoints associated with the second SRI field;
the mapping of the power control parameters to the joint SRI codepoints; and
a second mapping of the power control parameters to the joint SRI codepoints,
wherein the selecting the mapping of the power control parameters to the joint SRI codepoints from the plurality of mappings comprises selecting the mapping of the power control parameters to the joint SRI codepoints based on a value of the dynamic switching field; and
transmitting, to a transmission/reception point (TRP), one or more physical uplink shared channel (PUSCH) communications based on the SRS resources and the transmission parameters associated with the joint SRI.

11. The method of claim 1, wherein the transmitting the one or more PUSCH communications comprises transmitting, to the TRP, the one or more PUSCH communications sequentially using a same beam direction and common uplink power control parameters.

12. The method of claim 1, further comprising:
receiving a radio resource control (RRC) message, the RRC message including the transmission parameters.

13. The method of claim 1, further comprising:
receiving a first SRI and a second SRI;
transmitting, to a first TRP, one or more first PUSCH communications based on SRS resources and transmission parameters associated with the first SRI; and
transmitting, to a second TRP different than the first TRP, one or more second PUSCH communications based on SRS resources and transmission parameters associated with the second SRI, wherein the one or more second PUSCH communications are spatial division multiplexed with the one or more first PUSCH communications.

14. A method of wireless communication performed by a network unit, the method comprising:
transmitting, to a user equipment (UE), a joint sounding reference signal (SRS) resource indicator (SRI), wherein the joint SRI includes a first SRI field and a second SRI field; and
receiving, via a transmission/reception point (TRP), one or more physical uplink shared channel (PUSCH) communications based on SRS resources and transmission parameters associated with the joint SRI, wherein the transmission parameters associated with the joint SRI are based, at least in part, on a mapping of power control parameters to joint SRI codepoints, wherein the mapping of power control parameters to joint SRI codepoints is one of plurality of mappings, the plurality of mappings including:
the mapping of power control parameters to the joint SRI codepoints,
a mapping of power control parameters to codepoints associated with the first SRI field, and
a mapping of power control parameters to codepoints associated with the second SRI field.

15. The method of claim 14, further comprising:
transmitting, to the UE, a dynamic switching field, wherein the dynamic switching field indicates at least one mapping of a plurality of mappings, wherein the plurality of mappings includes:
  a mapping of power control parameters to codepoints associated with the first SRI field;
  a mapping of power control parameters to codepoints associated with the second SRI field; and
  a mapping of the power control parameters to codepoints associated with a joint SRI.

16. A user equipment (UE) comprising:
one or more memories; and
one or more processors coupled to the one or more memories, the one or more memories storing instructions that are executable by the one or more processors, individually or in any combination, to cause the UE to:
  receive a joint sounding reference signal (SRS) resource indicator (SRI), wherein the joint SRI includes a first SRI field and a second SRI field; and
  transmit, to a transmission/reception point (TRP), one or more physical uplink shared channel (PUSCH) communications based on SRS resources and transmission parameters using the joint SRI, wherein the transmission parameters associated with the joint SRI are based, at least in part, on a mapping of power control parameters to joint SRI codepoints, wherein the mapping of power control parameters to joint SRI codepoints is one of plurality of mappings, the plurality of mappings further including:
  the mapping of power control parameters to the joint SRI codepoints,
  a mapping of power control parameters to codepoints associated with the first SRI field, and
  a mapping of power control parameters to codepoints associated with the second SRI field.

17. The UE of claim 16, wherein the one or more processors are further configured to cause the UE to:
determine the SRS resources and the transmission parameters based on the joint SRI.

18. The UE of claim 17, wherein the one or more processors are further configured to cause the UE to:
determine one or more power control parameters based on the joint SRI.

19. The UE of claim 18, wherein the one or more processors are further configured to cause the UE to:
determine, based on the mapping of power control parameters to the joint SRI codepoints, the one or more power control parameters based on a codepoint value of the joint SRI.

20. The UE of claim 19, wherein the one or more processors are further configured to cause the UE to:
determine, based on a mapping of SRS resources to the joint SRI codepoints, the SRS resources based on the codepoint value of the joint SRI, wherein the SRS resources associated with the joint SRI are based, at least in part, on the mapping of SRS resources to the joint SRI codepoints, wherein the mapping of SRS resources to the joint SRI codepoints is one of plurality of SRS resource mappings, the plurality of SRS resource mappings further including a mapping of SRS resources to codepoints associated with the first SRI field and a mapping of SRS resources to codepoints associated with the second SRI field.

21. The UE of claim 19, wherein the one or more processors are further configured to cause the UE to:
select the mapping of the power control parameters to the joint SRI codepoints from the plurality of mappings.

22. The UE of claim 21, wherein the mapping of the power control parameters to the joint SRI codepoints includes mapping the power control parameters to the codepoints associated with the first SRI field.

23. The UE of claim 21, wherein the plurality of mappings further includes:
a second mapping of the power control parameters to the joint SRI codepoints.

24. The UE of claim 23, wherein:
the mapping of the power control parameters to the joint SRI codepoints includes mapping the power control parameters to the codepoints associated with the first SRI field; and
the second mapping of the power control parameters to the joint SRI codepoints includes mapping the power control parameters to the codepoints associated with the second SRI field.

25. The UE of claim 23, wherein the one or more processors are further configured to cause the UE to:
receive downlink control information (DCI), the DCI including the joint SRI and a dynamic switching field; and
select the mapping of the power control parameters to the joint SRI codepoints based on a value of the dynamic switching field.

26. The UE of claim 16, wherein the one or more processors are further configured to cause the UE to:
transmit, to the TRP, the one or more PUSCH communications sequentially using a same beam direction and common uplink power control parameters.

27. The UE of claim 16, wherein the one or more processors are further configured to cause the UE to:
receive a radio resource control (RRC) message, the RRC message including the transmission parameters.

28. The UE of claim 16, wherein the one or more processors are further configured to cause the UE to:
receive a first SRI and a second SRI;
transmit, to a first TRP, one or more first PUSCH communications based on SRS resources and transmission parameters associated with the first SRI; and
transmit, to a second TRP different than the first TRP, one or more second PUSCH communications based on SRS resources and transmission parameters associated with the second SRI, wherein the one or more second PUSCH communications are spatial division multiplexed with the one or more first PUSCH communications.

29. A base station (BS) comprising:
one or more memories; and
one or more processors coupled to the one or more memories, the one or more memories storing instructions that are executable by the one or more processors, individually or in any combination, to cause the BS to:

transmit, to a user equipment (UE), a joint sounding reference signal (SRS) resource indicator (SRI), wherein the joint SRI includes a first SRI field and a second SRI field; and receive, via a transmission/reception point (TRP), one or more physical uplink shared channel (PUSCH) communications based on SRS resources and transmission parameters associated with the joint SRI, wherein the transmission parameters associated with the joint SRI are based, at least in part, on a mapping of power control parameters to joint SRI codepoints, wherein the mapping of power control parameters to joint SRI codepoints is one of plurality of mappings, the plurality of mappings further including:

the mapping of power control parameters to the joint SRI codepoints, a mapping of power control parameters to codepoints associated with the first SRI field, and a mapping of power control parameters to codepoints associated with the second SRI field.

30. The BS of claim 29, wherein the one or more processors are further configured to cause the BS to:

transmit, to the UE, a dynamic switching field, wherein the dynamic switching field indicates at least one mapping of a plurality of mappings.

* * * * *